US012726348B2

(12) United States Patent
Baldawa et al.

(10) Patent No.: US 12,726,348 B2
(45) Date of Patent: Sep. 1, 2026

(54) EVENT ROUTING AND ENCRYPTION IN A MULTI-TENANT PROVIDER NETWORK

(71) Applicant: Amazon Technologies, Inc., Seattle, WA (US)

(72) Inventors: Rishi Baldawa, Vancouver (CA); Ekrem Yilmaz Kamoun, Seattle, WA (US); Siva Swaroop Palli, Port Moody (CA); Raghavendran Nehru, Surrey (CA); Xin Ge Gai, Vancouver (CA); Ziwen Zhao, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 18/533,649

(22) Filed: Dec. 8, 2023

(65) Prior Publication Data

US 2025/0193000 A1 Jun. 12, 2025

(51) Int. Cl.
*H04L 9/08* (2006.01)

(52) U.S. Cl.
CPC .................................... *H04L 9/088* (2013.01)

(58) Field of Classification Search
CPC ..... H04L 9/088; H04L 67/55; H04L 63/0428; G06F 21/6245
USPC .......................................................... 713/171
See application file for complete search history.

(56) References Cited

U.S. PATENT DOCUMENTS

| | | | | |
|---|---|---|---|---|
| 10,812,608 | B1 * | 10/2020 | Thummala Abbigari | H04L 67/55 |
| 11,422,871 | B1 * | 8/2022 | Mounirou | G06F 16/113 |
| 11,799,768 | B1 * | 10/2023 | Baldawa | H04L 45/28 |
| 11,917,035 | B1 * | 2/2024 | Soto Ridd | H04L 67/63 |
| 2014/0165140 | A1 * | 6/2014 | Singla | H04L 63/1416 726/1 |
| 2020/0036681 | A1 * | 1/2020 | Komashinskiy | G06N 20/00 |
| 2022/0075878 | A1 * | 3/2022 | Begg | G06N 3/045 |
| 2022/0414039 | A1 * | 12/2022 | Kamakura | G06F 13/36 |
| 2024/0069985 | A1 * | 2/2024 | Ghezzal | G06F 16/182 |
| 2024/0204985 | A1 * | 6/2024 | Bok | H04L 9/0825 |
| 2025/0260568 | A1 * | 8/2025 | Hamburg | H04L 9/0894 |
| 2025/0322083 | A1 * | 10/2025 | Sah | H04L 9/0822 |

* cited by examiner

*Primary Examiner* — Dereena T Cattungal
(74) *Attorney, Agent, or Firm* — Nicholson DeVos Webster & Elliott LLP

(57) ABSTRACT

In a multi-tenant network, event routing and encryption techniques involve processing events through an event bus service. When an event is received, it is evaluated against routing rules. If the event matches a rule linking to a resource in another customer account, the event data is encrypted using a key associated with that account. Finally, the encrypted event is delivered to the target resource, ensuring secure communication between different customer accounts within the network.

20 Claims, 11 Drawing Sheets

EVENT ROUTING AND ENCRYPTION IN A MULTI-TENANT PROVIDER NETWORK

BACKGROUND

Provider networks offer event bus services to their customers. These services aim to simplify the design and implementation of event-driven architectures by enabling real-time communication and coordination between various software applications, services, and resources by providing a central hub for routing and processing events. Event bus services may allow customers to connect different parts of their system or integrate with external systems, responding to events such as data changes, application events, and infrastructure updates. Event bus services may allow customers to define rules to route events to specific targets based on event content or patterns, making it possible, for example, to trigger serverless functions, send messages via notification services, queue messages in queuing services, or invoke serverless orchestration functions. Event bus services may support a wide range of provider network services as event sources and targets, making event bus services useful for building, for example, serverless applications, decoupled microservices, or event-driven workflows. Event bus services may enhance scalability, reliability, and agility in customer applications by offering a powerful tool for building responsive, loosely coupled systems that can adapt to changing business needs.

BRIEF DESCRIPTION OF THE DRAWINGS

The detailed description of certain embodiments of the invention below may be understood by reference to the following figures.

DETAILED DESCRIPTION

Figure 1:
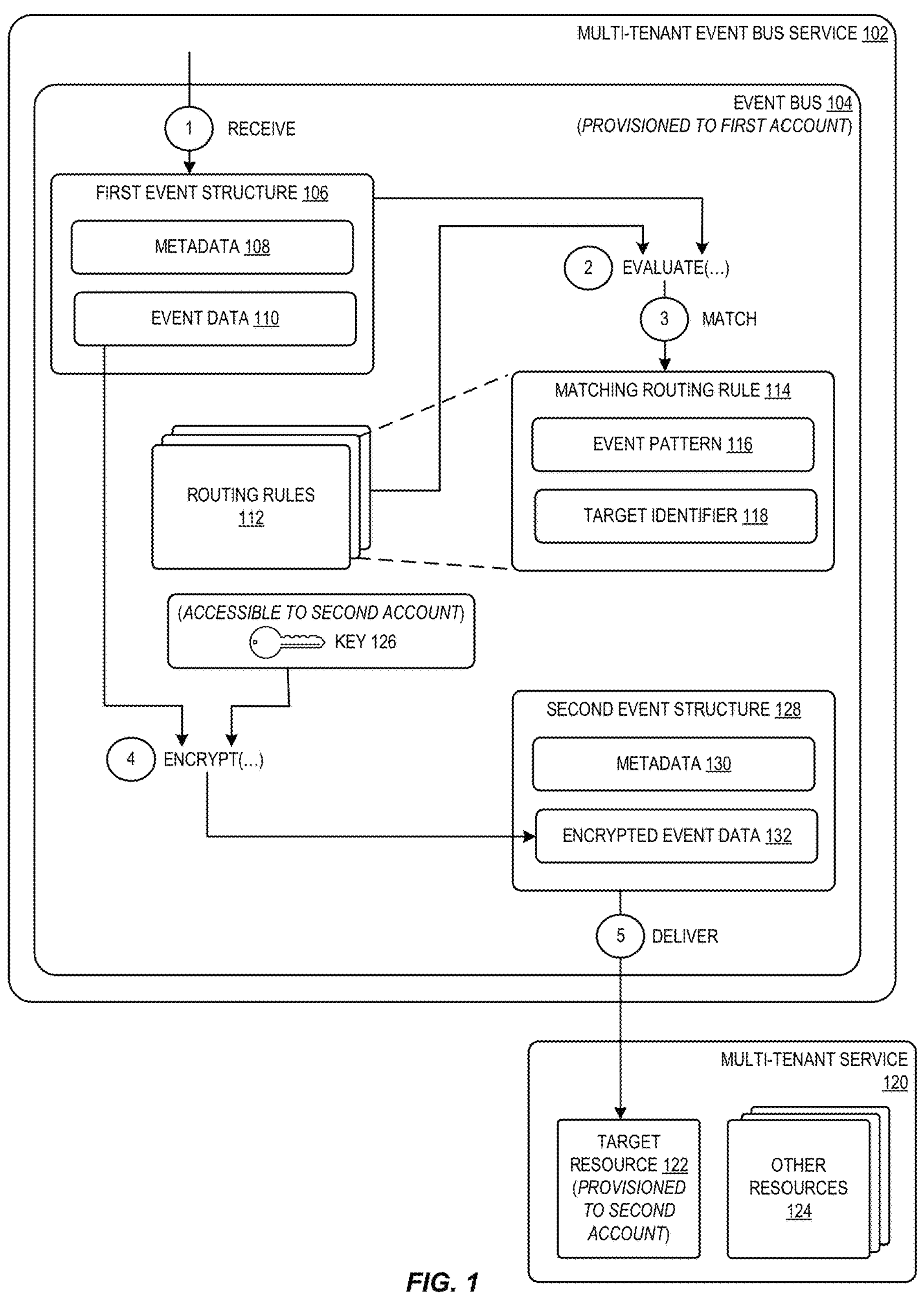
FIG. 1 illustrates an example system and method for receiving an event, evaluating routing rules, determining a match with a specific rule, encrypting the event data using a key from a different account, and delivering the encrypted event data to a target resource provisioned in a different customer account.

The present disclosure relates to systems, methods, and non-transitory computer-readable media (generally, "techniques") for event routing and encryption in a multi-tenant provider network. Specifically, the disclosed techniques relate to encryption in an event bus (also referred to as an "event bridge") service used for connecting different applications using events, such as changes in data or system actions. For example, an event bridge service according to the disclosed techniques can enable multi-tenant encryption for events in transit and at rest using customer-managed keys. This can allow customers to encrypt sensitive event data before sending it to the event bridge and to have it persist encrypted, while still allowing event bridge services like schema detection, archiving, and replication. The system can encrypt each customer's events with their specified key and pass an encrypted payload that contains metadata like the encryption key resource number, so downstream services can decrypt events. This enables multi-tenant resources like managed rules to receive events encrypted uniquely per tenant.

The security of sensitive data handled by event bus services can affect how useful those services are perceived. Consider an example of an event bus that receives messages containing sensitive governmental, banking, or critical utility service messages (e.g., 911 messages or electric grid messages) from a "source" customer of a provider network and delivers some of them to a different "target" customer of the provider network. The target customer may configure a routing rule with the event bus to have certain messages received at the event bus delivered to it. The security of the target customer's messages when being handled by the event bus can be critically important. For example, if the target customer's messages are stored in plaintext when durably stored at the event bus, then the target customer or the provider network may not be in compliance with applicable security standards for the sensitive data.

Techniques described herein address these and other issues.

Techniques are provided for event routing and encryption in a multi-tenant provider network, including a method pertaining to the functioning of an event bus service within a provider network. The method involves receiving a structured representation of an event (the first event structure) at an event bus, which is allocated to a specific customer account in the provider network. The method includes evaluating this event structure against a predefined set of routing rules associated with the event bus. When the event structure aligns with the event pattern of a specific routing rule, the process identifies a designated target resource within the provider network, which is associated with a different customer account. The event data from the first event structure is then encrypted using a cryptographic key belonging to the second customer account, resulting in encrypted event data. Finally, the method involves sending this encrypted event data as part of a new event structure (the second event structure) to the identified target resource, ensuring secure and targeted delivery of event information across different customer accounts within the provider network.

In an extension of the above-described method, the selection of the appropriate cryptographic key is based on a user-specified association. This association is determined at the event bus service within the provider network and links the particular cryptographic key directly with the specific routing rule being applied. This ensures that the cryptographic key used for encryption is not chosen arbitrarily or pre-assigned, but rather is specifically aligned with the routing rule that governs the transfer and encryption of event data between different customer accounts within the provider network. This enhances the security and specificity of data encryption in the event handling process.

In another extension of the above-described method, the selection process for the cryptographic key used in encrypting event data involves an additional step at the event bus service within the provider network, where the cryptographic key is specifically chosen based on a user-defined association. This association is between the cryptographic key and the target resource identified in the routing process. The selection of the cryptographic key is directly linked to the target resource, ensuring that the encryption key aligns with the intended recipient or destination of the event data. This enhances the security and relevance of the encryption process by ensuring that the cryptographic key used is specifically associated with and appropriate for the target resource receiving the encrypted event data.

In yet another extension of the above-described method, the second event structure, which is used to deliver the event data, explicitly identifies in plaintext the particular cryptographic key used for encrypting the event data. This means that along with the encrypted event data, the second event structure also contains an unencrypted, clearly visible indication of the specific cryptographic key that was employed in the encryption process. This approach allows for the clear identification of the encryption method used, aiding in the decryption process at the receiving end, while maintaining the secure transfer of the actual event data in its encrypted form.

In yet another extension of the above-described method, the second event structure, which was created for the purpose of delivering the encrypted event data, includes a clear identification of the event bus. This means that the second event structure not only carries the encrypted event data but also explicitly mentions the event bus from which the event data originated. This inclusion provides a reference to the source event bus, adding a layer of traceability and context to the event data being transmitted, thereby enhancing the clarity and informational value of the event delivery process within the provider network.

In yet another extension of the above-described method, the particular target resource, to which the encrypted event data is delivered, is part of a multi-tenant service within the provider network. This multi-tenant service includes not only the specified target resource but also other resources that are provisioned to various customer accounts within the same provider network.

In yet another extension of the above-described method, the first event bus sends encrypted event data to a particular target resource, which in this case is a second event bus provisioned to another customer account in the provider network. The second event bus receives the second event structure, which comprises both an unencrypted portion and the encrypted event data. The encrypted event data is decrypted using the particular cryptographic key or a cryptographic key associated with the particular cryptographic key, resulting in decrypted event data. This decrypted data, along with the unencrypted portion, forms a third event structure. This structure is then evaluated against a set of routing rules defined for the second event bus. Following the evaluation, the decrypted event data is re-encrypted using the same cryptographic key, resulting in reencrypted event data. This reencrypted data is then durably stored.

In yet another extension of the above-described method, a specific request to publish the first event structure to the event bus is received. This request includes an identifier of a particular cryptographic key. The method then involves selecting this specific cryptographic key for encrypting the event data, a decision based on the cryptographic key being explicitly identified in the publication request. This ensures that the cryptographic key used for encryption is not arbitrarily chosen but is instead directly linked to and determined by the publication request. This enhances the precision and security of the encryption process by ensuring the cryptographic key's alignment with the specific requirements or choices indicated in the publication request.

In yet another extension of the above-described method, the method additionally includes receiving a request to publish the first event structure to the event bus. This request contains the particular cryptographic key itself. Based on the inclusion of this specific cryptographic key within the publication request, the method then involves selecting that exact cryptographic key for the encryption of the event data. This ensures that the encryption of the event data is directly guided by the cryptographic key provided in the request to publish. This integration of the cryptographic key into the publication request streamlines the encryption process, ensuring that the key used for encryption is explicitly determined by the requestor's input in the request, thus enhancing the specificity and security of the data encryption.

In yet another extension of the above-described method, the method additionally includes receiving a publication request for the first event structure to the event bus. The event structure contains multiple cryptographic keys, including the specific cryptographic key of interest. The request to publish this event structure includes a path expression, a specific directive used to select the particular cryptographic key from among the plurality of keys present in the event structure. The method then focuses on selecting this particular cryptographic key for encrypting the event data, a decision guided by the key's selection through the path expression in the publication request. This ensures that the encryption process is specifically tailored to the user's input, enhancing the precision and security of the process by utilizing the exact cryptographic key identified through a defined path in the request.

Unless the context clearly indicates otherwise, any of the above extensions may be implemented in combination.

As mentioned, the security of sensitive data handled by event bus services can affect the utility of those services. Unfortunately, a consumer of events from an event bus can be a different organizational entity than the publisher of events to the event bus. So, using a single encryption key to encrypt all events when the events are at rest at the event bus may not be practical because encryption keys are not intended to be shared between the different organizational entities, or using a single encryption key such a scenario may not otherwise comply with applicable privacy or security requirements. Thus, a more flexible approach is needed.

Along with the need for flexibility, there remains the need for security. Techniques herein meet the needs for both security and flexibility when routing and encrypting events in a multi-tenant provider network, using a method pertaining to the functioning of an event bus service within a provider network. The method involves receiving a structured representation of an event (a first event structure) at an event bus, which is allocated to a first customer account in the provider network. The method includes evaluating this event structure against a predefined set of routing rules associated with the event bus. When the event structure aligns with the event pattern of a specific routing rule, the process identifies a designated target resource within the provider network, which can be associated with a different second customer account. The event data from the first event structure is then encrypted using a cryptographic key belonging to the second customer account, resulting in encrypted event data. Finally, the method involves sending this encrypted event data as part of a new event structure (a second event structure) to the identified target resource, ensuring secure and targeted delivery of event information across different customer accounts within the provider network.

As an example of a technical problem addressed herein, consider a first customer of a provider network that uses an event bus service offered by the provider network to deliver selected event messages to a second customer of the provider network. For example, the first customer and the second customer may be distinct businesses or organizations that are partnering on a particular project where the second customer requires certain sensitive event information from the first customer. For example, the events may contain personally identifiable information (PII) or sensitive governmental, banking, or business information. The event bus service may be multi-tenant in that many different unrelated customers may use the same service. The event bus service may encrypt multiple customers' event data when at rest at an event bus of the service using a cryptographic key that is private to the event bus service. The use of a cryptographic key that is shared among multiple customers or that is accessible to the provider network may be undesirable to the second customer or may not comply with security or privacy requirements imposed on the second customer by regulation or otherwise. As such, flexibility in configuring the cryptographic key that is used to encrypt events destined for the second customer when at rest at the event bus may be very important to the second customer.

The techniques provide greater flexibility regarding the cryptographic key that is used to encrypt messages when at rest at an event bus in cross-account scenarios where one customer's published event messages are delivered to a different customer. Further, the techniques can be used not just in cross-account scenarios but more generally in any scenario where per-routing rule or per-target resource event message encryption is desired. A customer-provided cryptographic key used for encrypting event messages can be a symmetric cryptographic encryption key or a public cryptographic encryption key of an asymmetric cryptographic encryption key-pair.

Turning now to FIG. 1, it illustrates an example system and method for receiving an event, evaluating routing rules, determining a match with a specific rule, encrypting the event data using a key from a different account, and delivering the encrypted event data to a target resource provisioned in a different customer account. Steps of the example method are depicted by numbered circles overlaying directed arrows. The directed arrows represent a direction of data flow but not necessarily the exclusive direction. At a high-level, the method proceeds at step 1 where a first event structure representing an event is received at an event bus of an event bus service in the provider network. The event bus is provisioned to a first provider network customer account. At step 2, a set of one or more routing rules defined for the event bus are evaluated against the first event structure at the event bus. At step 3, a determination is made at the event bus that the first event structure matches an event pattern of a particular routing rule of the set of one or more routing rules. The particular routing rule specifies a particular target resource in the provider network provisioned to a second provider network customer account to which to deliver the event. At step 4, event data of the first event structure is encrypted using a particular cryptographic key belonging to the second provider network account to yield an encrypted event data. At step 5, a second event structure representing the event and encapsulating the encrypted event data is delivered to the particular target resource specified by the particular routing rule.

The example system includes a multi-tenant provider network 100. The multi-tenant provider network 100 encompasses shared computing infrastructure designed to serve multiple customers, or tenants, simultaneously. In the network 100, various computing resources such as servers, storage, and networking capabilities are provided by a single provider but partitioned among different customers. Each customer within network 100 has its own secure and isolated environment, ensuring privacy and security despite the shared nature of the computing infrastructure. This architecture allows for efficient utilization of computing resources, as the infrastructure's capabilities can be dynamically allocated and scaled according to the individual needs of each customer. The multi-tenancy model is particularly prevalent in cloud computing, where it enables cost-effective and flexible solutions for businesses by allowing them to pay only for the resources they use. The provider is responsible for the maintenance and management of network 100, offering customers the benefits of advanced technology without the burden of managing complex computing infrastructures. Network 100 is suitable for a variety of applications, from hosting websites to supporting large-scale enterprise systems, providing a balance of resource efficiency, scalability, and security.

The provider of the network 100 may offer a diverse range of application services to its customers, catering to various business needs and operational scales. One of the primary services the provider of the network 100 may offer is cloud hosting, where customers can host their websites, applications, and databases on the provider's infrastructure, benefiting from scalability and high availability. Software as a Service (SaaS) may be another offering of the network 100, where customers access software applications over the internet, eliminating the need for local installations and maintenance. This may include a wide range of applications from email services, customer relationship management (CRM)

tools, to complex enterprise resource planning (ERP) systems. The provider may also offer Platform as a Service (PaaS), enabling customers to develop, run, and manage applications without the complexity of building and maintaining the underlying infrastructure. For data-driven businesses, the provider of the network 100 may offer big Data analytics and storage services or other services that provide the ability to store, process, and analyze large datasets to gain insights. Additionally, the network 100 may offer integrated security services, such as identity and access management, threat detection, and encryption services to ensure data privacy and protection. The amalgamation of these services in the network 100 allows for cost efficiency, flexibility, and scalability, meeting the diverse and evolving needs of different businesses.

One service that network 100 may offer to customers is a multi-tenant event bus service 102 (referred to in other examples as an event grid service, event handler service, or publish-subscribe (pub/sub) service). Multi-tenant event bus service 102 encompasses messaging infrastructure that enables different customers to efficiently handle and process various types of events, such as data changes, user actions, or system triggers. In this context, an "event" broadly encompasses any significant occurrence within or outside a system that requires some form of processing or response. The multi-tenant nature of the event bus service 102 allows multiple customers to utilize the same infrastructure while maintaining isolation and security of their data and processes. Each customer can define their own events, subscribe to specific events they are interested in, and publish events to be consumed by other services or customers within the network 100. The event bus service 102 manages the routing of these events based on predefined rules and policies, ensuring that the right events reach the appropriate destinations. Event bus service 102 is useful for integrating different applications and services in network 100, enabling them to communicate and react to each other's actions in real-time. For example, an update in a database can trigger an event that informs other applications of this change, enabling them to react accordingly. This service streamlines workflows and enhances the responsiveness of applications within the multi-tenant provider network, offering a robust and scalable solution for event-driven architectures and real-time data processing.

Event bus service 102 facilitates the building of event-driven applications within the network 100. Service 102 operates by using event buses to receive, filter, and route events. These events can originate from various sources, such as other services in network 100, custom applications, or third-party Software-as-a-Service (SaaS) applications. Once an event is generated, it is sent to an event bus of service 102. The event bus functions as the central pipeline for these events.

Service 102 supports routing rules that are defined for each event bus. These routing rules determine how to process and route the incoming events to the event bus. The routing rules can filter events based on specific characteristics, like the source of the event or data contained within the event. When an event matches a rule, service 102 routes it to one or more designated target resources which can be other resources provided by other services in network 100 like serverless compute service functions, publish-subscription service topics, queuing service queues, or Hyper Text Transfer Protocol (HTTP) endpoints in network 100. This routing performed by service 102 allows for the automated triggering of workflows and processes in response to the events.

Service 102 can handle events across different customer accounts. In some embodiments, service 102 can handle events across different regions of the network 100. A cloud provider network can be formed as a number of regions, where a region is a separate geographical area in which the cloud provider clusters data centers. In many cases, each region represents a geographic area (e.g., a U.S. East region, a U.S. West region, an Asia Pacific region, and the like) that is physically separate from other regions. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). In some implementations, the cloud provider network can include one or more cellular networks (such as a public or private 4G, 5G, or other "G" network) that run at least partly on the cloud's infrastructure. This compartmentalization and geographic distribution of computing hardware enables the cloud provider network to provide low-latency resource access to customers on a global scale with a high degree of fault tolerance and stability.

An event bus of service 102 can handle events generated by other services of network 100 on behalf of customers or application events generated by customer applications deployed in network 100. In some embodiments, service 102 provides a schema discovery service which aids in understanding the format of the events and aids in the construction of event filters and transformation of event data.

Service 102 includes event bus 104 provisioned to a first provider network customer account. For example, a user of the first account may use a graphical user interface (GUI), command line interface (CLI), or software development kit (SDK) of service 102 to create the event bus 104 in their account. When the user of the first customer account creates the event bus 104 in the first account, service 102 automatically provisions and configures the event bus 104 within the scope of the first account, ensuring that the event bus 104 is isolated and secure with respect to other customer accounts.

As indicated, the event bus 104 may operate on behalf of the first customer account as a centralized hub within network 100 for routing events from various sources to specified targets. The event bus 104 can be defined for customer-specific application events generated by applications in network 100 or for events generated by other services in the network 100. Various other services in the network 100 may publish events to the event bus 104 including any or all of: an elastic computing service that publishes events related to the state changes of virtual machine instances; a storage service that publishes events for various activities like data object creation, deletion, or modification; a monitoring and observability service that publishes events based on specific metrics or log monitoring alarms; a serverless orchestration service that publishes events on state transitions in workflows; a relational database service that publishes database instance events such as backups, creations, or modifications; a NoSQL database service that publishes events for changes to data in database tables; a continuous integration/continuous development (CI/CD) code pipeline service that publishes events related to change in the state of a CI/CD pipeline; a publish-subscription notification service that publishes events based on message delivery to a message topic or change; or any other suitable service in network 100 that publishes events 100 to event bus 104.

In a collaborative or interconnected business environment, there are several scenarios where a first customer may grant permission to a second customer to configure routing rules on the first customer's event bus 104. For instance, in a B2B (Business-to-Business) partnership, the first customer could be a service provider whose services are integral to the operations of the second customer, such as a SaaS (Software as a Service) company. In such a case, the second customer might need to configure routing rules to respond to specific events (like data updates or transaction completions) generated by the first customer's services. Similarly, in supply chain management, a supplier (first customer) could allow a retailer (second customer) to set up routing rules on the first customer's event bus 104 to streamline inventory management, where events like stock depletion automatically trigger restock orders. Another situation could be in a collaborative development project, where multiple organizations (customers) are working together. Here, one party (the second customer) might need to respond to development lifecycle events (like deployment or testing results) on another party's (the first customer) event bus 104 to coordinate their joint efforts efficiently. In all these scenarios, the ability to configure routing rules on another customer's event bus facilitates seamless integration and real-time response, leading to more synchronized and efficient inter-company operations.

The example method of FIG. 1 provides a way so that events received at event bus 104 that are routed by a routing rule configured by a second customer account to one of the second customer's resources in the network 100 can be encrypted using a cryptographic key provided by the second customer while the events are at rest at event bus 104 and before the events are delivered to the second customer's target resource.

Returning to the top of FIG. 1, at step 1, a first event structure 106 representing an event is received at the event bus 104. First event structure 106 may be a structured data format such as JavaScript Object Notation (JSON), extensible Markup Language (XML), or the like. The structured data format provides a standardized way to describe the event. First event structure 106 may include several fields, some of which are part of the metadata 108 about the event and some of which are part of the event data 110 of the event. The fields that are part of the metadata 108 are typically not encrypted and the fields that are part of the event data 110 may or may not be encrypted in the first event structure 106. The fields of metadata 108 typically adhere to a schema that is common to all events while the fields of event data 110 typically adhere to an event-type specific schema that may vary from type of event to type of event. The field of event data 110 typically contains information that is pertinent to the event itself, which may include sensitive information such as, for example, personally identifiable information (PII) or other sensitive information.

If event data 110 is encrypted when received at step 1 (e.g., by a cryptographic key accessible to the first customer account), then the event bus 104 may decrypt the event data 110 using the appropriate cryptographic key before proceeding to step 2.

In the network 100 that offers event bus service 102, the process at step 1 of receiving the first event structure 106 at the event bus 104 can be an aspect of an event-driven architecture. The event bus 104 is provided by the network 100, and event bus 104 is provisioned or allocated to the first provider network customer account. This event bus 104 serves as a central hub for events related to the first customer's resources or applications. When an event occurs—for example, a change in a database, a user action, or a system update—it generates an event structure 106. This event structure 106 is a formatted data packet (e.g., in JSON), which encapsulates all relevant information about the event, such as its source, type, and specific details. This first event structure 106 is then sent to the event bus 104 that is provisioned for the first customer's account. The event bus 104 receives this structure 106, acting as a receiver and dispatcher. Once received, the event bus 104 can process this event structure 106 according to pre-defined rules 104 and route it to the appropriate targets or services for further action. This could involve, for example, invoking a serverless function for processing, storing the event in a database, or triggering a workflow. The event bus 104 is tailored to the specific needs and configurations of the first customer's account, ensuring that the first event structure 106 is handled in a manner that aligns with their operational and business requirements.

The first event structure 106 is a detailed package of information that represents an occurrence within a system or application. This event structure 106 is formatted as a JSON object or other like structured-text object and comprises key components: metadata fields 108 and event data 110. The metadata fields 108 provide context about the event; they may include information such as, for example, any of the following information: the event source (identifying where the event originated, like a specific service in network 100 or a custom application), the event timestamp (marking when the event occurred), a unique event ID (for tracking and referencing the event), or any other suitable contextual information. Additionally, the metadata fields 108 can include information about the region of network 100 or account ID (e.g., the account ID of the first customer), offering further context for the event's origin.

The event data fields 110, on the other hand, carry the substantive content of the event. This is where the specific details pertinent to the event are stored. For instance, if the event structure 106 is related to a change in a virtual machine instance, the event data fields 110 might include details about the instance's state, its ID, and other relevant attributes. In custom application events, these fields 110 can contain application-specific data, such as user actions, transaction details, or performance metrics. In either case, the event data fields 110 may carry sensitive information.

In provider network 100, the event bus service 102 operates by evaluating incoming events against a predefined set of routing rules to determine how these events should be handled. When the first event structure 106, encapsulating the details of an event, arrives at the event bus 104, it undergoes this evaluation process. Each event bus has its own set of routing rules, which are essentially conditions or patterns that the incoming event data must match. These rules are defined by the customer and can be based on various aspects of the event structure, such as the source of the event, specific values in the event's metadata or data fields, or certain patterns in the event's content.

After the first event structure 106 is received at step 1, the event bus service 102 systematically compares it against these routing rules 112 at step 2. This comparison involves checking if the event structure 106 matches the criteria set out in any of the rules 112. For example, a rule 112 might specify that it applies to all events coming from a particular source with a specific keyword in the data field. If the first event structure 106 matches the conditions of a particular rule 114, the event bus 104 then triggers the actions associated with that rule. These actions could include, for example, forwarding the event structure 106 or an event structure derived from event structure 106 to a specific target like a serverless code execution service function for processing, sending a notification, or initiating a workflow.

The process at step 3 of matching the incoming first event structure 106 to a specific routing rule 114 involves a detailed evaluation based on a predefined event pattern 116. Each routing rule 112 in the set associated with the event bus 104 is defined with specific criteria or patterns that the event structure 106 must meet to be considered a match. These patterns can include various attributes of the event structure 106, such as its source, specific keywords in the event data 110, or other metadata 108 characteristics.

When the first event structure 106 is received by the event bus 104, the service 102 begins a comparison process. It systematically checks the event structure 106's attributes against the patterns defined in each routing rule. If the attributes of the first event structure 106 align with the pattern 116 specified in a particular routing rule 114, the service 102 determines that there is a match. This specific routing rule 114 not only defines the pattern 116 for matching but also specifies 118 a target resource 122 in the provider network 100 to which the event should be routed.

This target resource 122 can be provisioned to a different second customer account within the provider network 100. This capability is significant for cross-account event processing, allowing events generated in one customer's environment (the first customer account) to trigger processes or workflows in another customer's environment (the second customer account). This feature enables collaborative and interconnected workflows between different customers in the provider network 100, enhancing the versatility and applicability of the event bus service 102 for diverse business needs and scenarios.

At step 4, the encryption of the event data 110 from the first event structure 106 is performed when the event is intended for a target resource 122 in a different customer account. This process begins once the event bus service 102 determines that the first event structure matches 106 a specific routing rule 114 and identifies 118 a target resource 122 in a second provider network customer account.

This encryption process at step 4 includes the utilization of a particular cryptographic key 126 that is accessible to the second customer account, the account where the target resource 122 resides. This cryptographic key 126 is unique to the second account, ensuring that the encryption is secure and specific to the intended recipient. When the event bus service 102 prepares to send the event data 110 to the target resource 122, it encrypts the data 110 of the first event structure 106 using this cryptographic key 126.

The encryption process at step 4 transforms the original event data 110 into an encrypted format 132, rendering it unreadable to anyone who does not possess the corresponding decryption key. This encrypted event data 132 is then included in the event structure 128 (now modified to contain the encrypted data 132) that will be sent to the target resource 122. The second event structure 128 may also include metadata 130. Metadata 130 may encompass metadata 108 plus one or more additional fields as described in greater detail below with respect to FIG. 4. The use of the second account's cryptographic key 126 ensures that only entities with access to this key or a key corresponding to it (e.g., the private key of a public/private asymmetric key pair), such as resources (e.g., 122) within the second customer's account, can decrypt and access the original event data 110. This method of encrypting event data 110 enhances the security of cross-account communications within the provider network, safeguarding sensitive information as it moves between different customer environments.

Once the event bus service 102 has encrypted the event data 110 using a cryptographic key 126, it proceeds to step 5 of delivering the encrypted data 132 to the specified target resource 122. This process involves creating a second event structure 128, which represents the original event, but with a difference: the event data 132 within this structure 128 is now encrypted. The second event structure 128, therefore, contains the encrypted event data 132, ensuring that the information remains secure and inaccessible to unauthorized entities during transmission.

This encrypted second event structure 128 is then routed to the particular target resource 122 specified in the matching routing rule 114. The target resource 122 may be a service or application provisioned to a different customer account within the provider network 100. The event bus service 102 handles the delivery of this event structure 128, ensuring that it reaches the intended destination. Upon reaching the target resource 122, the encrypted event data 132 can be decrypted and utilized, provided that the resource 122 has access to the appropriate cryptographic key for decryption. This key is usually managed and stored securely within the second customer's account, aligning with best practices for data security. The key can be key 126 itself if symmetric encryption is used to encrypt event data 110. Alternatively, the key can a key associated with key 126 such as a private key corresponding public key 126 in the case of an asymmetric key pair.

This delivery mechanism is a feature of the event bus service 102, enabling secure and efficient communication between different services and applications, possibly across different customer accounts. By encrypting the event data 110 and delivering it in a new, secure event structure 128, the service 102 ensures that sensitive information is protected throughout the transmission process, maintaining data integrity and confidentiality in complex, multi-tenant environments such as network 100.

In the multi-tenant service environment within the provider network 100, resources (e.g., 122 and 124) are provisioned and managed in a way that allows multiple customers to share the underlying infrastructure while maintaining isolation and security of their individual resources. In this context, the particular target resource 122 provisioned to a second customer account is just one of many resources allocated within this shared infrastructure. For example, in an event-driven architecture service 102, a specific customer (the second account) might have an event bus or a serverless code execution function as their target resource 122. This target resource 122 is part of a multi-tenant service 120 within the multi-tenant provider network 100, which also includes similar resources 124 provisioned to other customer accounts. Each of these resources (e.g., 122 and 124), whether they are compute instances, storage systems, or application services, is isolated from others in terms of data and operation, ensuring privacy and security. However, they all coexist within the same provider infrastructure, benefiting from shared resources like network bandwidth, hardware, and software capabilities. The multi-tenant service 120 can be the multi-tenant event bus service 102 (e.g., where the target resource 122 is an event bus provisioned to the second customer account) or another multi-tenant service within the provider network 100 such as, for example, an elastic compute service, a serverless code execution service, or other type of application service in the provider network 100.

This shared yet isolated environment is a hallmark of cloud computing and multi-tenancy. It allows for cost-effective scaling, as customers only pay for the resources they use, and the provider can optimize resource utilization across all customers. Despite the shared nature of the infrastructure, rigorous security and isolation protocols including the techniques disclosed herein for event routing and encryption ensure that each customer's data and operations remain private and secure, unaffected by the activities of other tenants in the network. This setup facilitates efficient and flexible resource management for a diverse range of customers, each with their unique configurations and requirements.

Figure 2:
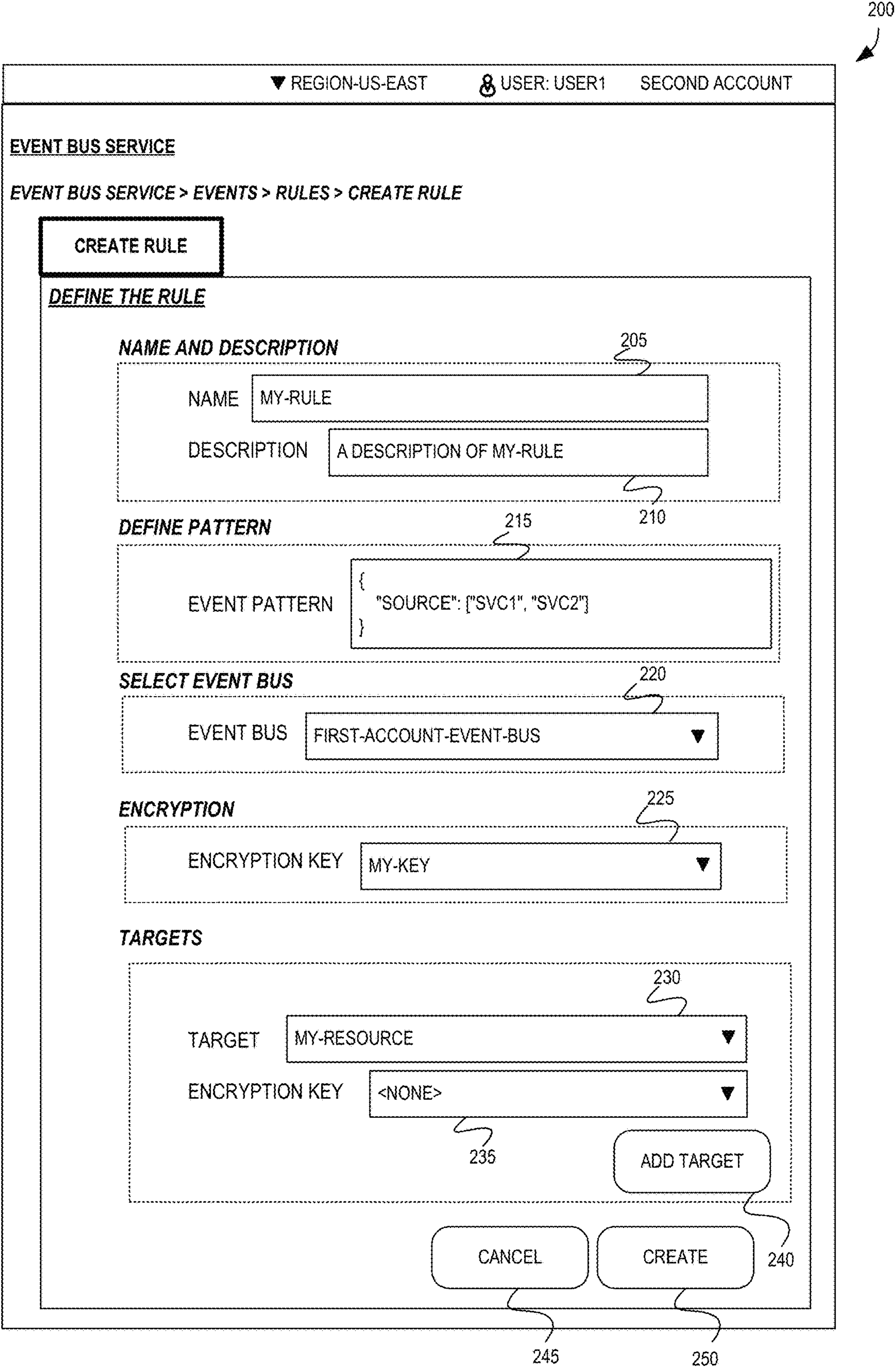
FIG. 2 illustrates a graphical user interface for selecting the specific cryptographic key for encrypting the event data based on a user-specified association between the key and the routing rule.

FIG. 2 illustrates a graphical user interface for selecting the specific cryptographic key for encrypting the event data based on a user-specified association between the key and the routing rule. Graphical user interface (GUI) 200 of service 102 that may be presented to a user the second account (e.g., at the user's personal computing device) for creating matching routing rule 114. In this example, the user specifies that cryptographic key 126 accessible to the second account is to be used to encrypt all event structures received at event bus 104 that match routing rule 114 (e.g., event structure 106). In this example, the first customer account has given permission to the second customer account through identity and access controls managed by network 100 to create the routing rule 114 attached to the first customer's event bus 104.

In name field 205, the user of the second account has provided a name for the routing rule 114 to be created. In the description field 210, the user has provided a description of the routing rule 114 to be created. In the event pattern field 215, the user has input an event pattern expression for matching against event structures that determines which event structures match the routing rule 114 to be created. In this example, event structures received at event bus 104 match if the value of the "source" field of the event structure equal "svc1" or "svc2." In the event bus field 220, the user of the second account has selected the event bus 104 provisioned to the first account to which to attach the routing rule 114 being created. In the encryption field 225, the user has selected the key 126 accessible to the second account to specify that all event structures matching the routing rule 114 being created that are received at event bus 104 are to be encrypted using key 126. In the target field 230, the user has selected target resource 122 provisioned to the second account to which to deliver matching event structures that have been encrypted using key 126. And in the per-target encryption key field 235, the user has not selected an encryption key that overrides the per-rule encryption key selected in field 225. GUI 200 also includes controls 240 for adding more targets to routing rule 114, controls 245 for canceling the creation of the routing rule 114, and controls 250 for creating the routing rule 114 in accordance with the input specified via the other controls of GUI 200.

Figure 3:
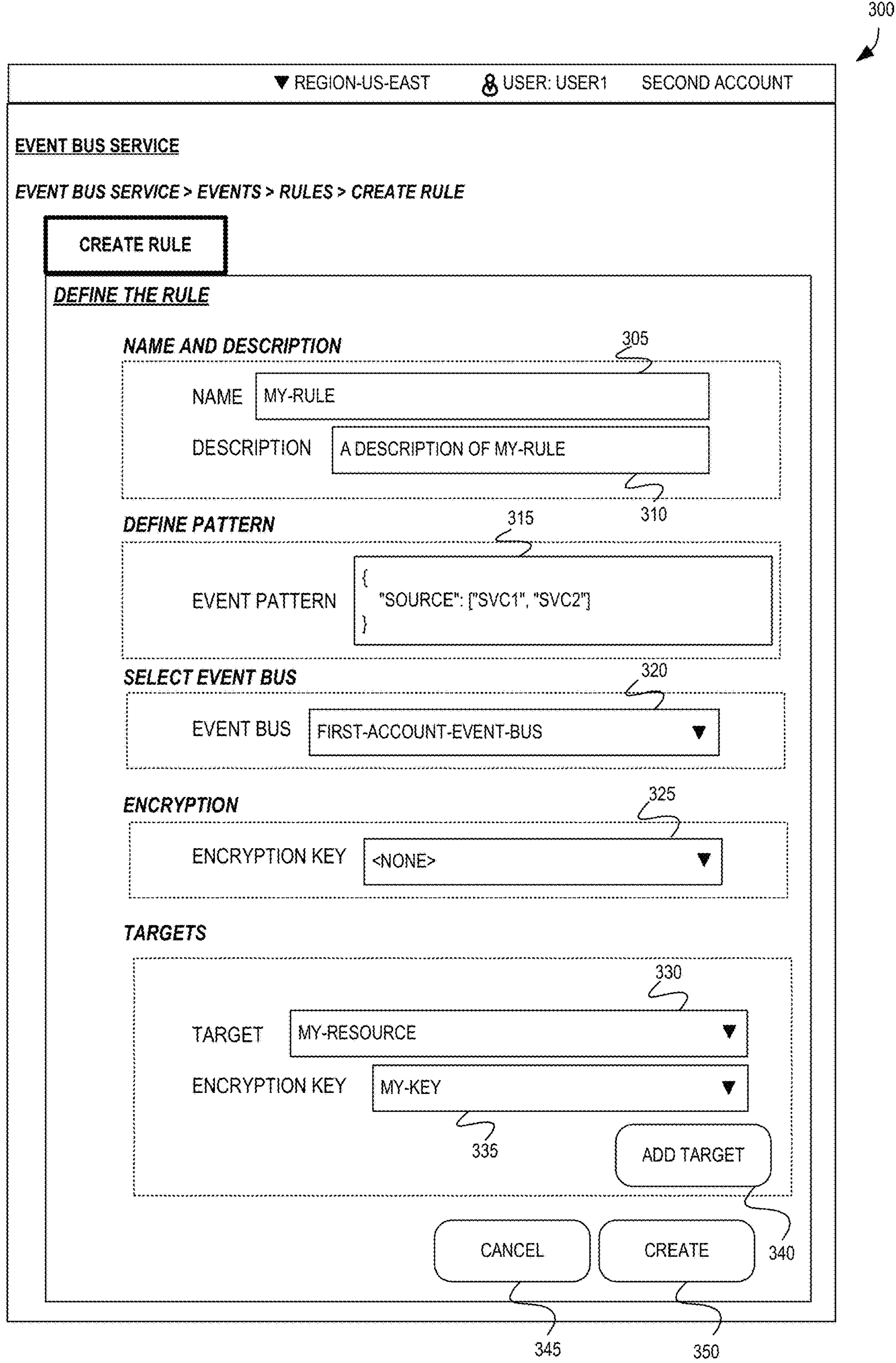
FIG. 3 illustrates a graphical user interface for selecting the specific cryptographic key for encrypting the event data based on a user-specified association between the key and the target resource.

FIG. 3 depicts an example graphical user interface (GUI) for selecting the specific cryptographic key for encrypting the event data based on a user-specified association between the key and the target resource. Graphical user interface (GUI) 300 of service 102 may be presented to a user the second account (e.g., at the user's personal computing device) for creating matching routing rule 114. In this example, the user specifies that cryptographic key 126 accessible to the second account is to be used to encrypt event structures received at event bus 104 that match routing rule 114 (e.g., event structure 106) when those matching event structures are delivered to target resource 122. In this example, the first customer account has given permission to the second customer account through identity and access controls managed by network 100 to create the routing rule 114 attached to the first customer's event bus 104. If there are multiple targets for routing rule 114, a different cryptographic key can be specified for each target to use to encrypt matching event structures delivered to that target.

In name field 305, the user of the second account has provided a name for the routing rule 114 to be created. In the description field 310, the user has provided a description of the routing rule 114 to be created. In the event pattern field 315, the user has input an event pattern expression for matching against event structures that determines which event structures match the routing rule 114 to be created. In this example, event structures received at event bus 104 match the routing rule 114 being created if the value of the "source" field of the event structure equal "svc1" or "svc2." In the event bus field 320, the user of the second account has selected the event bus 104 provisioned to the first account to which to attach the routing rule 114 being created. In the encryption field 325, the user has selected no pre-rule cryptographic key. In the target field 330, the user has selected target resource 122 provisioned to the second account to which to deliver matching event structures. And in the per-target encryption key field 335, the user has selected key 126 so that matching event structures delivered to target resource 122 are encrypted using key 126. GUI 300 also includes controls 340 for adding more targets to routing rule 114, controls 345 for canceling the creation of the routing rule 114, and control 350 for creating the routing rule 114 in accordance with the input specified via the controls of GUI 200.

As shown in FIG. 2 and FIG. 3, the user of the second account can create a routing rule that is attached to the event bus provisioned to the first account such that event structures received at the event bus matching the routing rule are encrypted using a cryptographic key specified on a per-routing rule basis such that all event structures matching the routing rule are encrypted using the specified per-routing rule cryptographic key accessible to the second account or additionally or alternatively specified on a per-target basis such that all event structures matching the routing rule that are delivered to a target are encrypted using the specified per-target cryptographic key accessible to the second account. This allows the user to have all matching event structures encrypted using the same key or using different keys on a target-by-target basis.

Figure 4:
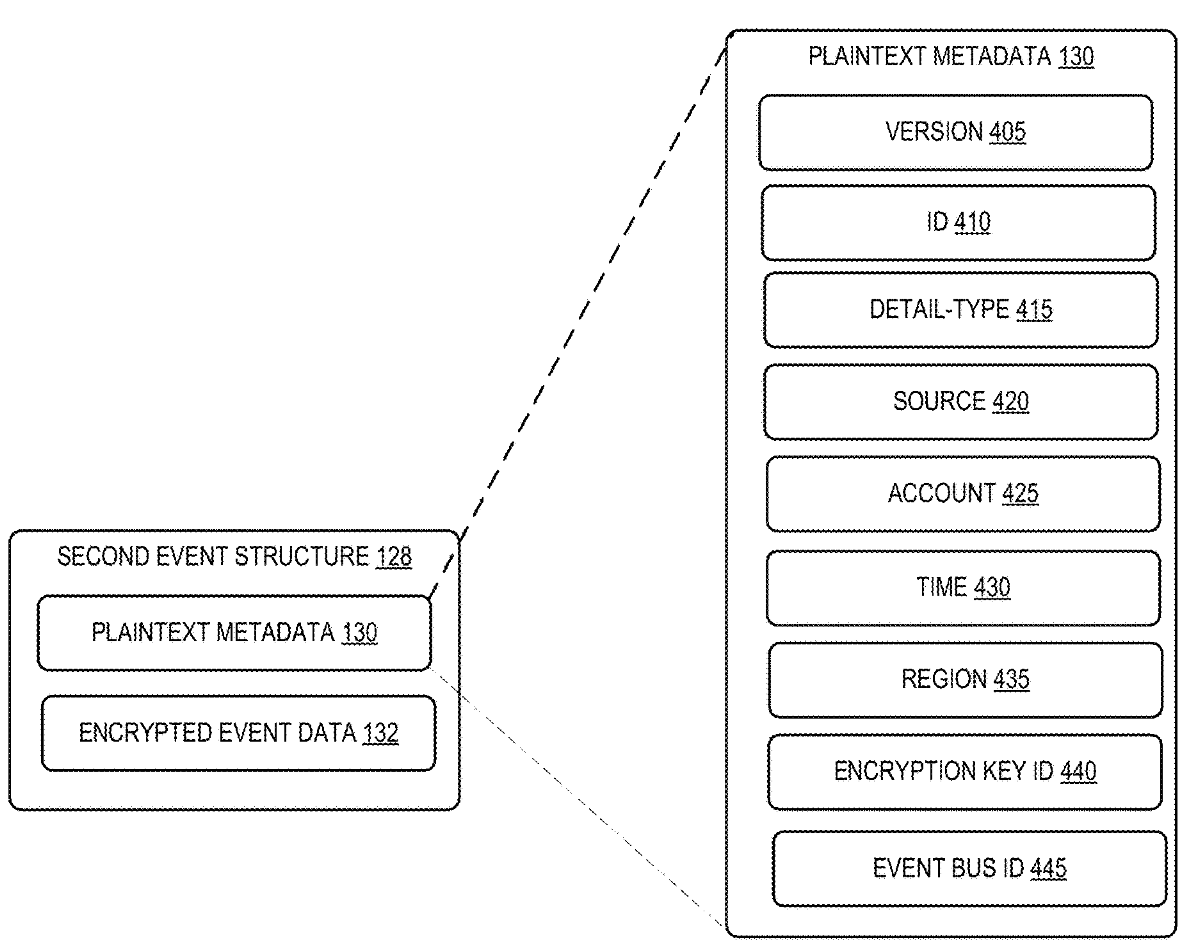
FIG. 4 illustrates an event structure that identifies in plaintext the particular cryptographic key used to encrypt the event data and the specific event bus used to encrypt the event data.

FIG. 4 illustrates an event structure that identifies in plaintext the particular cryptographic key used to encrypt the event data and the specific event bus used to encrypt the event data. In particular, the second event structure 128 delivered to the target resource 122 provisioned to the second account include plaintext identifiers 440 and 445 for both the cryptographic key 126 and the event bus 104, respectively. Identifying the cryptographic key 126 in plaintext within the encrypted event structure 128 provides essential information for the recipient (e.g., the target resource 122 to the second provider network customer account). This allows the recipient to decrypt the encrypted event data 132 using the correct key, facilitating secure and efficient data access. The correct key may be key 126 itself or a private key corresponding to key 126, where key 126 is a public key of an asymmetric key pair. It should be noted that while the key's identifier is in plaintext, the key 126 itself remains secure and is not exposed as plaintext in event structure 128. Secondly, the plaintext identification 440 of the event bus 104 within the second event structure 128 adds a layer of transparency and traceability to the process. It enables the recipient (e.g., target resource 122) to know precisely which event bus 104 was used for encrypting the event data 110. This is useful for maintaining an audit trail, ensuring compliance with data handling policies, and troubleshooting any issues that might arise in the data transmission process. Together, these plaintext identifications 440 and 445 contribute to a secure, transparent, and efficient system for routing and encrypting sensitive data in a multi-tenant provider network.

Other plaintext metadata 130 included in second event structure 128 includes any or all of: version 405, ID 410, detail-type 415, source 420, account 425, time 430, and region 435. Version 405 specifies a version of a general event structure to which event structure 128 conforms. ID 410 contains a unique identifier for the event that second event structure 128 represents. Detail-type 415 describes the specific type or category of the event represented by the event structure 128. Source 420 identifies the original or service in network 100 that generated the event represented by the event structure 128. Account 425 identifies the provider network customer account from which the event originated (e.g., the first provider network customer account). Time 420 indicates when the event occurred. Region 425 specifies the region of provider network 100 where the event originated.

In techniques disclosed herein, the use of a cryptographic key for encrypting event data ensures secure communication between different customer accounts in a multi-tenant provider network. The techniques involve encrypting the event data using a particular cryptographic key that belongs to the second provider network customer account. This is done before delivering the event structure to the target resource, which is provisioned under the second customer account. While the techniques allow for the cryptographic key or a reference to it to be indicated or included in the event structure sent to the target resource, this is not a necessity. For example, transmitting the encryption key along with the encrypted data may not be a preferred or desired practice due to security concerns. Instead of including the cryptographic key in the event structure, the target resource can determine the key used for encryption from other metadata present in the event structure. This metadata could include fields like the source field 420 or the account field 425. These fields provide contextual information about the origin of the event, or the account associated with it. The source field 420 can indicate the origin of the event, such as a specific service or application within the first customer's environment. The target resource could use this information to identify the appropriate cryptographic key associated with that particular source. Similarly, the account field 425 in the metadata can specify the account (e.g., the first provider network customer account) associated with the event bus from which the event originated. The target resource, knowing the account from which the event was sent, can then use the corresponding cryptographic key that is expected to be used for encryption by that account. This approach allows the target resource to decrypt the event data securely without the need to transmit the cryptographic key alongside the data. It adds a layer of security, as the decryption key is not exposed during transmission. The target resource, upon receiving the event, examines the metadata, identifies the correct key based on this metadata, and then proceeds to decrypt the event data. In a multi-tenant environment, where resources are shared among multiple customers, such mechanisms are useful for maintaining data security and privacy. They allow different tenants to securely communicate and exchange data, with assurances that each party can only access data intended for them, and in a manner that safeguards against unauthorized access. The techniques allow for secure data encryption and transmission between different customer accounts in a multi-tenant provider network, with the target resource determining the correct cryptographic key based on metadata within the event structure, rather than relying on the key being included in the event structure itself. This approach enhances security by minimizing the risk associated with transmitting the encryption key directly.

Figure 5:
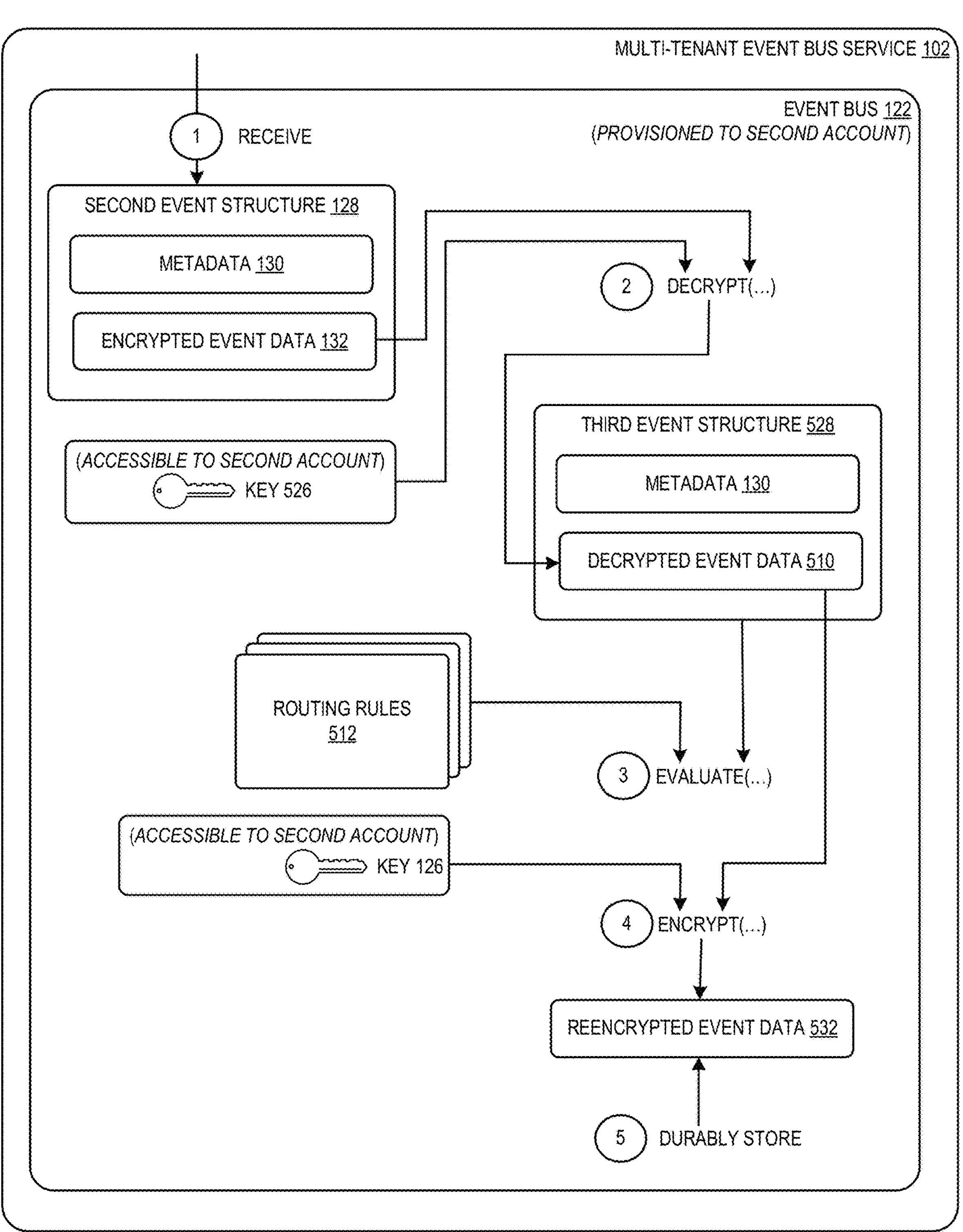
FIG. 5 illustrates an example system and method encompassing multiple event buses, with the first event bus initially receiving an event and routing it to a second event bus provisioned in a different customer account, which then decrypts, evaluates, re-encrypts, and durably stores the event data.

FIG. 5 illustrates an example system and method encompassing multiple event buses, with the first event bus initially receiving an event and routing it to a second event bus provisioned in a different customer account, which then decrypts, evaluates, re-encrypts, and durably stores the event data. In this example, the target resource 122 to which the second event structure 128 is delivered by the event bus 104 provisioned to the first customer account is an event bus of event bus service 104 provisioned to the second customer account.

At step 1, the second event bus service 122 securely handles and processes the event data 128 within the multi-tenant provider network. 100 This process begins with the second event bus 122 receiving the second event structure 128. This event structure 128 comprises two distinct parts: an unencrypted portion 130 and encrypted event data 132. The encrypted part 132 is particularly important for maintaining the security and privacy of the event data as it transits through the multi-tenant network 100 including event bus service 104.

The encrypted event data 132 within the second event structure 128 is a product of a preceding step shown in FIG. 1. Initially, the first event structure 106 is received by the first event bus 104, associated with the first provider network customer account. After matching the event pattern 116 of a specific routing rule 114, the event data 110 of this first structure 106 is encrypted using a cryptographic key 126 that belongs to the second provider network customer account. This encryption ensures that the data 110 remains secure and inaccessible to unauthorized entities during its transfer within the network 100 including multi-tenant event bus service 102.

Subsequently, this encrypted data 132, now part of the second event structure 128, is delivered to the second event bus 122, which is provisioned to the second provider network customer account. The unencrypted portion 130 of the second event structure 128 allows for certain non-sensitive information to be readily accessible for immediate processing or routing decisions at the second event bus 122. In contrast, the encrypted data 132 ensures that sensitive information remains secure and is only accessible to authorized entities equipped with the appropriate cryptographic key.

At step 2, the decryption of encrypted event data 132 is executed at the second event bus 122, which has received the second event structure 128 containing both unencrypted 130 and encrypted data 132. The encrypted portion 132 of this event structure 128 is specifically meant for secure transmission and requires decryption for further processing or analysis at event bus 122.

The decryption at step 2 is carried out using a particular cryptographic key 526 which is provisioned to the second provider network customer account. Key 526 can be key 126 used to encrypt event data 110 or a key associated with key 126. For example, key 526 can be a private key corresponding to public key 126 where private key 526 and public key 126 are an asymmetric public-private key pair. Cryptographic key 526 ensures that only authorized entities with access to this key 526 can decrypt and access the sensitive data 110.

When the second event bus 122 receives the second event structure 128, it utilizes the appropriate cryptographic key 526 to decrypt the encrypted event data 132. This decryption transforms the encrypted data 132 back into its original, readable form, referred to as decrypted event data 510. The decrypted data 510 is essentially a return to the data's original state before it was encrypted for secure transmission (e.g., event data 110).

The ability to decrypt the data 132 accurately and securely hinges on the correct implementation and management of cryptographic key 526. The system must ensure that the key 526 is securely stored, managed, and accessed only by authorized personnel or systems.

At step 3, the evaluation of routing rules 412 by the event bus service 102 occurs at the second event bus 122, after event data 132 has been securely transmitted and decrypted as event data 510. The second event bus 122 processes a third event structure 528, which is composed of both an unencrypted portion 130 and the decrypted event data 510, the latter having been encrypted initially for secure transfer and then decrypted upon receipt at event bus 122.

The evaluation process at step 3 involves the second event bus 122 examining this third event structure 528 against a predefined set of one or more routing rules 512. These rules 512 determine how the event structure 528 should be handled and where it should be directed within the multi-tenant provider network 100. Each routing rule 512 is designed to identify specific patterns or characteristics in the event data 510, which can include various parameters such as data type, source, destination, content, or other relevant attributes.

When the third event structure 528 is presented to the second event bus 122, the service 102 systematically assesses it against these routing rules 512. This evaluation is akin to filtering the event structure 528 through a sieve of criteria established by the rules 512. If the event structure 528 matches the pattern or criteria of a particular rule, it triggers a corresponding action as defined by that rule. This action could involve forwarding the event structure 528 to a specific destination, initiating a process, or even triggering another set of operations within the network. Before the action is taken, the event data 510 may be re-encrypted at the event bus 122 using cryptographic key 534 as re-encrypted event data 532. The cryptographic key 534 can be a symmetric key or a public key of an asymmetric key pair. Then, the event structure 528 with decrypted event data 510 replaced by the re-encrypted event data 532 may be forwarded to a specific target.

At step 4, the re-encryption of decrypted event data 510 at the event bus service 102 within the multi-tenant provider network 100 maintains data security and integrity. This process at step 4 occurs after the event data 110, initially encrypted 132 and then decrypted at step 2 for processing or evaluation at step 3, is secured again for further use or transmission within the network.

The re-encryption is conducted using the same particular cryptographic key 126 that was initially used to encrypt the original event data 110. This key 126 is specific to the second provider network customer account to which the second event bus 122 is provisioned. The use of this specific cryptographic key 126 ensures that the re-encrypted data 532 remains secure and accessible only to entities authorized to access this key 126 or the private key corresponding to public key 126.

When the event bus service 102 begins the re-encryption process at step 4, it takes the decrypted event data 510—which is now in a plain, readable format—and applies the cryptographic key 126 to transform it back into an encrypted format 532. The result of this process is the re-encrypted event data 532, which retains the same content as the decrypted data 510 but in a secure, encrypted form.

At step 5, the durable storage of re-encrypted event data 532 ensures the long-term protection and availability of the data. After the event data 110 has undergone encryption, decryption, and re-encryption processes, the event bus service 102 securely stores this re-encrypted data 532. The term "durable storage" refers to a method of storing data in a manner that ensures its persistence over time, safeguarding against data loss due to system failures, network issues, or other unforeseen disruptions. In this scenario, after the event bus service 102 re-encrypts the decrypted event data 510 using the particular cryptographic key 126, it stores this data 532 in a stable and secure storage system. This storage system is typically a part of the multi-tenant provider network 100's infrastructure and is designed to be highly reliable and resilient.

The durable storage system could involve various technologies such as redundant storage arrays, cloud storage services, or distributed databases, depending on the architecture and requirements of the provider network. These systems are engineered to provide high availability and data integrity, ensuring that the stored data remains intact and accessible when needed, even in the event of hardware malfunctions or network outages.

When the event bus service 102 stores the reencrypted event data 532, it ensures that the data 532 is written to the storage system in a manner that confirms its successful and complete storage. This process might involve mechanisms like write acknowledgment, data replication across multiple physical locations, or regular backups. The goal is to ensure that once the data 532 is stored, it can be retrieved in its exact form whenever required, thereby providing a reliable and secure data repository.

Figure 6:
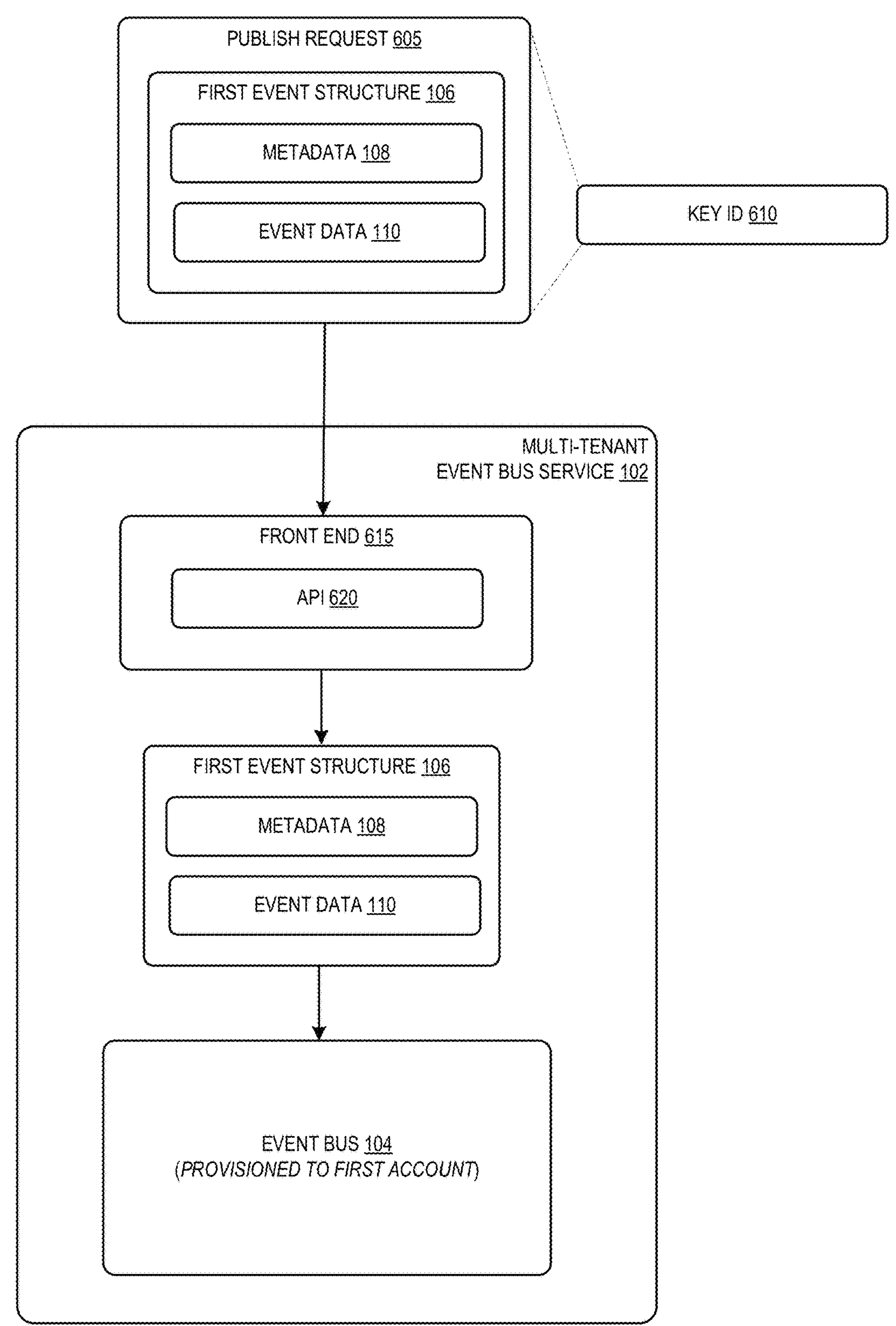
FIG. 6 illustrates an example system and method where the event bus service receives a request to publish an event structure and selects a specific cryptographic key for encrypting the event data based on the cryptographic key identifier provided in the request.

FIG. 6 illustrates an example system and method where the event bus service receives a request to publish an event structure and selects a specific cryptographic key for encrypting the event data based on the cryptographic key identifier provided in the request. The event bus service 102 operates within the multi-tenant provider network 100, which caters to different customer accounts. The process of receiving a request 605 to publish the event structure 106 to the event bus 104 and selecting the cryptographic key 126 is an aspect of ensuring secure data handling and transmission.

When the event occurs, it is encapsulated into the first event structure 106. This structure 106 is prepared to be sent to the event bus service 104. Alongside this event structure 106, a request 605 to publish it to the event bus 104 is generated. This request 605 includes a component for data security: the identifier 610 of a particular cryptographic key.

The inclusion of the cryptographic key identifier 610 in the publish request 605 is a significant security measure. In a multi-tenant environment, where numerous clients utilize shared network resources, ensuring data confidentiality and integrity is paramount. By specifying a cryptographic key in the publish request 605, the sender indicates which cryptographic key should be used to encrypt the event data 110. This key is unique to a specific customer account in the network such as the account that is either the intended recipient of the event data 110 or has the authority to handle it.

Upon receiving this publish request 605 at the front end 615 of service 102 that implements an application programming interface (API) 620, the event bus service 102 then performs a key selection process. It uses the identifier 610 provided in the request to select the exact cryptographic key from a pool of available keys. This selection process matches the key identifier 610 with the corresponding key. After the correct key is identified and selected, it is used to encrypt the event data 110 within the first event structure 106 as described in greater detail elsewhere herein.

The front-end implementation 615 for the API 620 of the event bus service 102 presents a programmatic interface invokable over a network (e.g., an IP network), enabling other computing processes to interact seamlessly with the event bus service 102 in the multi-tenant provider network 100. This interface may allow calling processes to create and define event structures, including specifying relevant details like event type, payload, and the identifier 610 for the cryptographic key. Additionally, it may offer options to define or select routing rules, and a mechanism to submit the publish request 605 to the event bus 104. The interface might also programmatically provide real-time logs or status updates, providing users or other computing processes with feedback on the event handling process, such as confirmation of successful encryption and dispatch of event structures.

Figure 7:
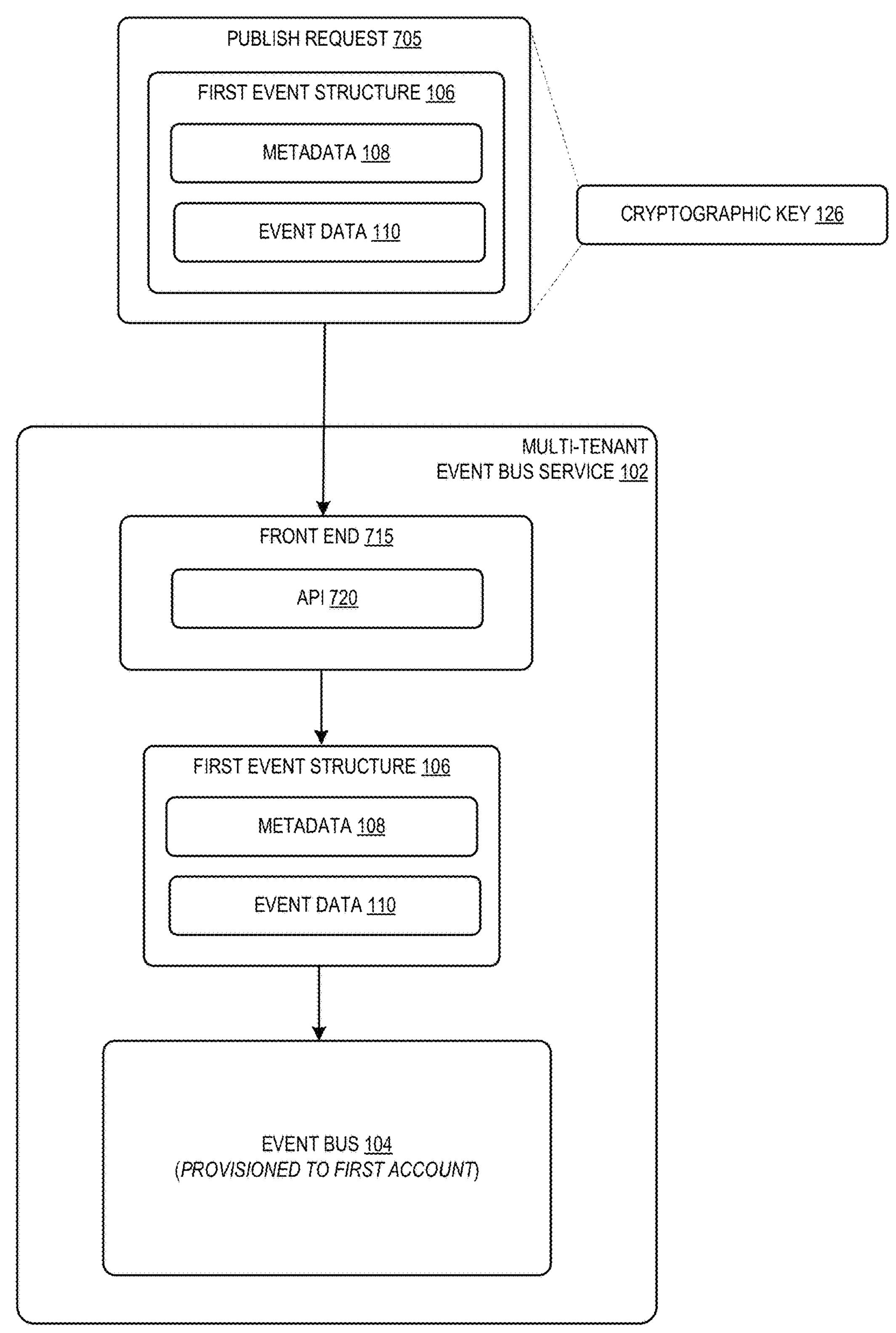
FIG. 7 illustrates an example system and method where the event bus service receives a request to publish an event structure, including the specific cryptographic key, and selects that cryptographic key for encrypting the event data based on its presence in the request to publish.

FIG. 7 illustrates an example system and method where the event bus service receives a request to publish an event structure, including the specific cryptographic key, and selects that cryptographic key for encrypting the event data based on its presence in the request to publish. The event bus service 102, operating in the multi-tenant provider network 100, receives a request 705 to publish the first event structure 106 to the event bus 104. This request 705 includes a specific cryptographic key 126.

Upon receiving this request 705 at the front end 715 of event bus service720 that implements API 720, the event bus service 102 proceeds to the selection of the cryptographic key to use to encrypt event data 110. This key selection is based directly on the key 126 provided in the request. By doing so, the event bus service 102 ensures that the encryption of the event data 110 is aligned with the security parameters specified by the client in the request 705. The selected key 126, unique to a specific client or transaction within the network 100, is then used to encrypt the event data 110 within the first event structure 106.

Figure 8:
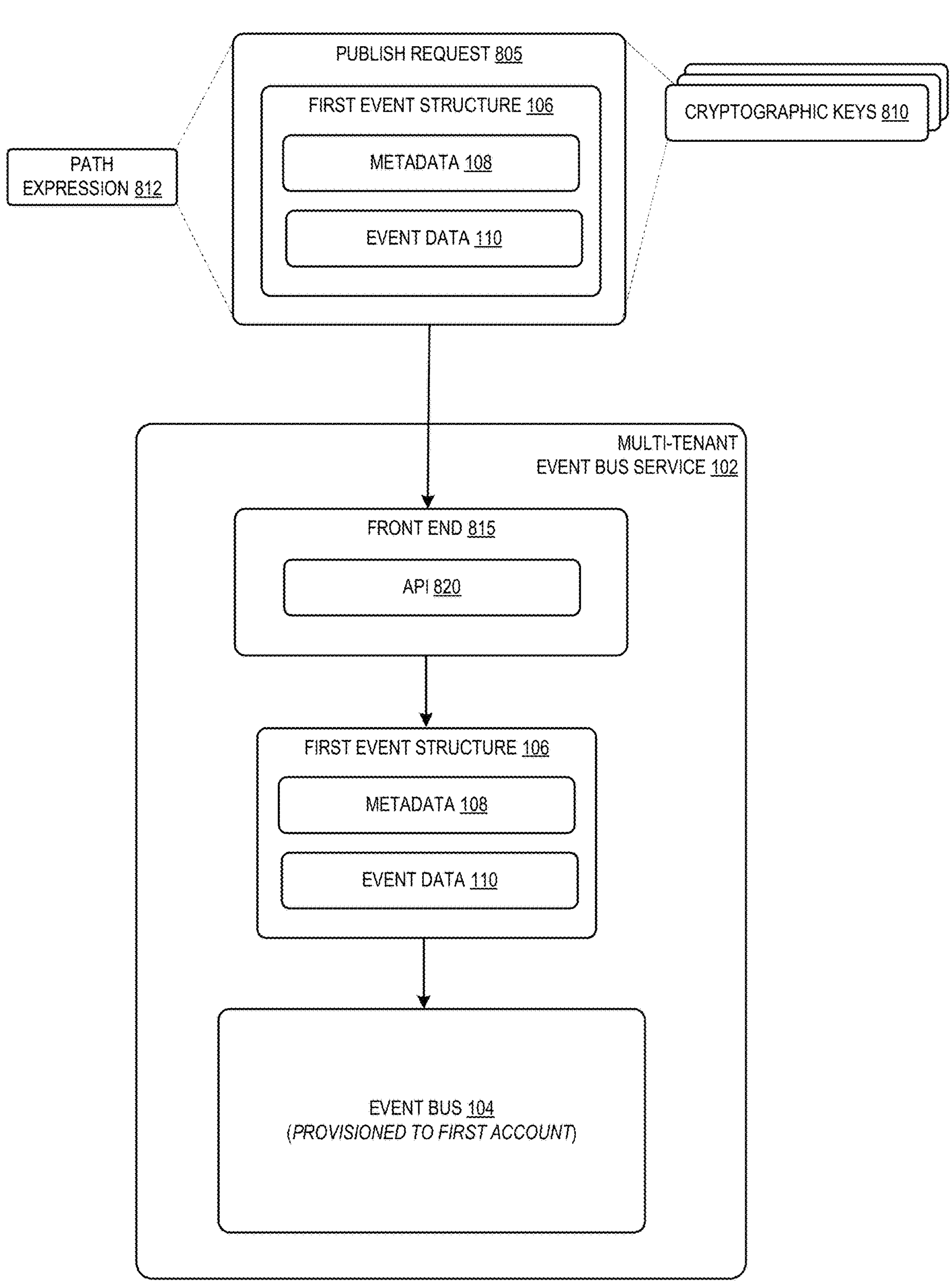
FIG. 8 illustrates an example system and method where the event bus service receives a request to publish an event structure containing multiple cryptographic keys, including the particular cryptographic key, with the selection of the specific cryptographic key for encrypting the event data determined by a path expression specified in the request.

FIG. 8 illustrates an example system and method where the event bus service receives a request to publish an event structure containing multiple cryptographic keys, including the particular cryptographic key, with the selection of the specific cryptographic key for encrypting the event data determined by a path expression specified in the request. The event bus service 102 within the multi-tenant provider network 100 handles a sophisticated process of securely publishing and encrypting event data 110. Initially, the service 102 receives a request 805 to publish the first event structure 106 to the event bus 104. This first event structure 106 contains a plurality of cryptographic keys 810 (or identifiers thereof), among which is the specific key intended for encrypting the event data 110. The inclusion of multiple cryptographic keys 810 (or identifiers thereof) within a single event structure 106 reflects the diverse and secure environment of the multi-tenant provider network 100, where different keys might correspond to different customer accounts or specific data handling requirements.

The publishing request 805 contains a path expression 812 (e.g., a JSON path expression or an XPath expression). This path expression 812 is a targeted directive within the request 805, designed to select the particular cryptographic key 126 from the array of keys 810 present in the first event structure 106. The use of a path expression 812 is a methodical and precise approach, allowing for the pinpointing of the exact key required for the encryption process, amidst potentially numerous other keys.

Upon receiving this request 805 with the path expression 812 at the front end 815 of the service 102 implementing API 820, the event bus service 102 then selects the cryptographic key for encryption. The service 102 interprets the path expression 812 and uses it to identify and select the particular cryptographic key 126 from the first event structure 106. This selection is dictated by the specific path expression 812 provided in the publish request 805. Once the correct cryptographic key 126 is identified and chosen, it is used to encrypt the event data 110 within the first event structure 106.

The techniques described herein encompass a process for handling events within a multi-tenant provider network. In the case where the provider network spans multiple regions, the provider network spanning multiple regions can efficiently route data and events across different geographical locations. In a cross-region scenario, the event bus can handle events originating from different regions, ensuring they are routed correctly across regional boundaries. The techniques include evaluating routing rules against received events. In a cross-region context, these rules can be designed to identify the region from which an event originates or the region where the target resource is located. This enables the system to route events across regions based on predefined patterns and rules. Encrypting event data using a cryptographic key belonging to the target account enhances security, which is useful in cross-region scenarios. Data transmitted across regions is potentially exposed to various network vulnerabilities. Encryption ensures that even if data is intercepted, it remains unreadable and secure. The techniques involve delivering a modified event structure to a specific target resource, which can be in a different region. The multi-tenant network's design allows for communication and data transfer across regions, ensuring that events are delivered to the correct targets regardless of their geographic location. As such, the techniques components are well-suited to support such cross-regional operations in a multi-tenant provider network. The key elements—such as an event bus service, routing rules, encryption, and the ability to target resources in different regions—are useful to managing and routing events securely and efficiently across a distributed, multi-regional network.

The techniques disclosed herein encompass a process where the encryption of event data is handled using a cryptographic key belonging to the second provider network customer account, not the first account associated with the event bus. Initially, the event bus is provisioned to a customer account (the first provider network customer account). This means that this event bus is primarily configured and used according to the needs and specifications of the first customer account. However, this does not necessarily imply that the encryption of all data passing through this event bus must use the cryptographic key of the first customer account. When an event structure is received by the event bus, it's evaluated against a set of routing rules. These rules dictate how different types of events are processed and where they are directed. Upon matching an event pattern with a specific routing rule, the method identifies a particular target resource, which is associated with a different customer account (the second provider network customer account). Once the event structure matches the criteria of the routing rule associated with the second customer account's target resource, the event data is encrypted using the cryptographic key belonging to this second account. This is useful for maintaining data privacy and security, particularly in a multi-tenant environment where resources and services are shared among different customers. By encrypting the event data with the key of the second account (the target resource's account), the method ensures that the data remains secure and is only accessible to the intended recipient, even though it passed through an event bus associated with a different account. In this context, the term "override" doesn't imply that the second key directly interacts with or changes the settings of the first key. Rather, it means that in this particular transaction, the relevance of the first customer's cryptographic key is bypassed or set aside. The encryption process prioritizes the security requirements of the target resource (associated with the second customer account), ensuring that the data is only accessible to entities holding the correct decryption key (the second account's key). This approach aligns with the principles of multi-tenancy, where despite shared infrastructure, each tenant's (customer's) data is kept isolated and secure. By using the cryptographic key of the target account for encryption, the method ensures that the data remains confidential and integral, accessible only to authorized parties, thereby maintaining the integrity and security of multi-tenant environments.

Techniques disclosed herein encompass the specification or inclusion of a particular cryptographic key in a request to publish the first event structure to the event bus. When a request is made to publish the first event structure to the event bus, it can include a specification or direct inclusion of the cryptographic key to be used for encrypting the event data. This specification is part of the publishing request and dictates how the event data should be secured before it is transmitted through the event bus. The inclusion of a specific cryptographic key in the publishing request in some embodiments effectively overrides any default or previously established encryption settings that might be associated with the event bus, the routing rules, or even the target resource. If the event bus is configured to use a default cryptographic key (possibly associated with the first provider network customer account that owns the event bus), the key specified in the publish request takes precedence. This ensures that the encryption of the event data is tailored to the specific security requirements of the particular transaction, rather than relying on a more generic or broadly applied encryption standard. Similarly, if the routing rules defined for the event bus imply a specific encryption process or cryptographic key (e.g., based on the type of event or its destination), the key included in the publishing request would override these settings. This allows for greater flexibility and customization in how data is secured, especially in complex scenarios where different types of events might have different security needs. Even if the target resource (associated with the second provider network customer account) has a specific cryptographic key for decryption, the key specified in the publish request needs to be used for encryption. This means that the target resource must be capable of determining and using the correct key for decryption, which might involve a level of coordination or predefined agreement between the different parties involved. This approach to specifying the encryption key enhances security and data privacy. By allowing the publisher of the event to dictate the encryption key, the sensitive data is protected according to the specific needs and security policies of the entities involved. This is useful in a multi-tenant environment, where different tenants may have varying security requirements and protocols. Including the cryptographic key in the publish request provides operational flexibility, allowing for dynamic security management. It enables the customization of security measures on a per-event basis, which is beneficial in a provider network that handles a diverse range of events and data types. By allowing the cryptographic key to be specified or included in the publish request for the first event structure, the techniques provide a mechanism to customize and override the default or associated encryption settings of the event bus, routing rules, and target resource. This flexibility is useful for ensuring that data is encrypted and handled in a way that meets the specific security needs of the various parties involved in the multi-tenant provider network.

Figure 9:
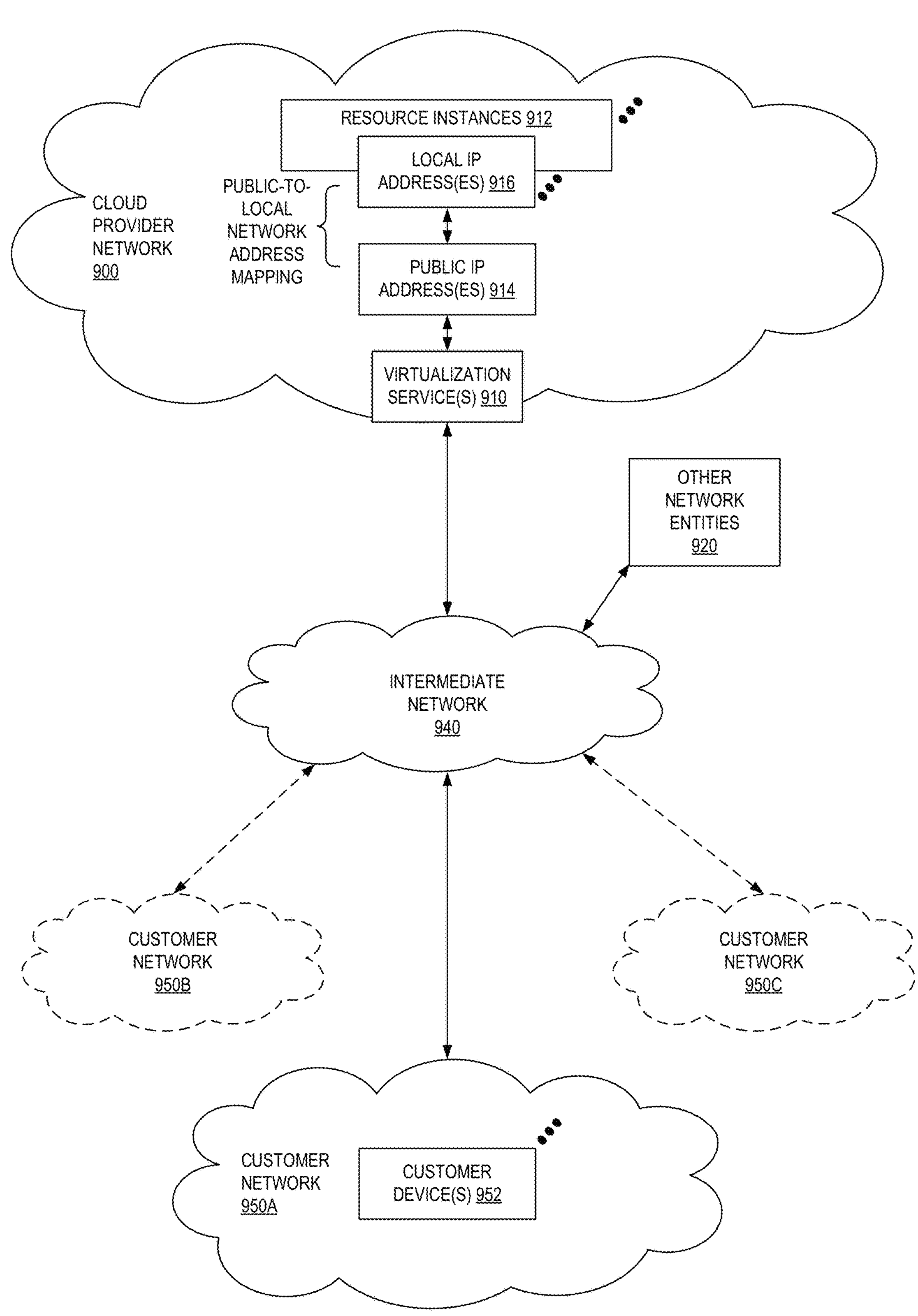
FIG. 9 illustrates an example cloud provider network environment in which the techniques disclosed herein for event routing and encryption in a multi-tenant provider network may be implemented.

FIG. 9 illustrates an example cloud provider network environment in which the techniques disclosed herein for event routing and encryption in a multi-tenant provider network may be implemented. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
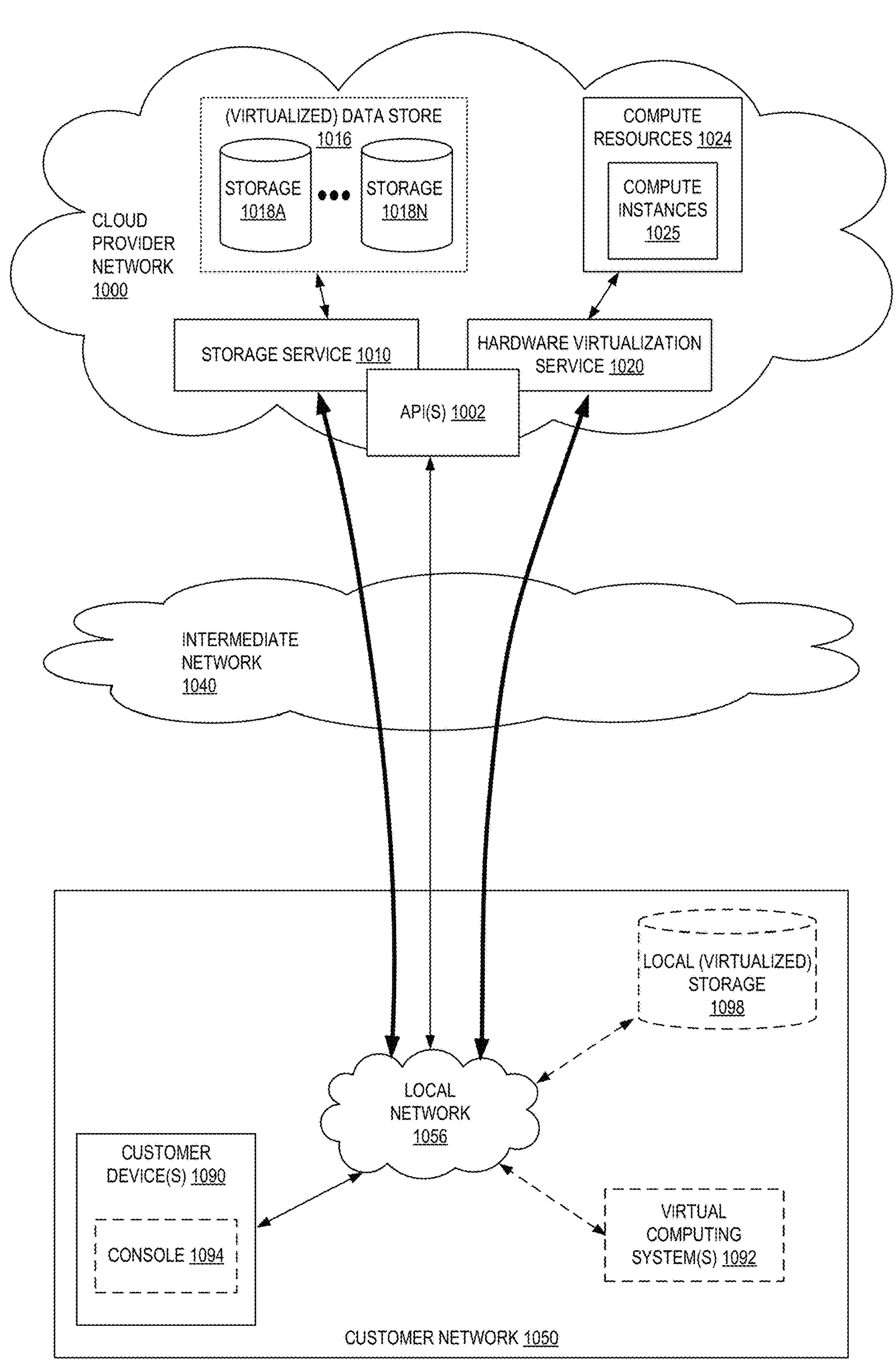
FIG. 10 is a block diagram of an example cloud provider network that provides a storage service and a hardware virtualization service to customers and in which the techniques disclosed herein for event routing and encryption in a multi-tenant provider network may be implemented.

FIG. 10 is a block diagram of an example cloud provider network that provides a storage service and a hardware virtualization service to customers and in which the techniques disclosed herein for event routing and encryption in a multi-tenant provider network may be implemented. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Figure 11:
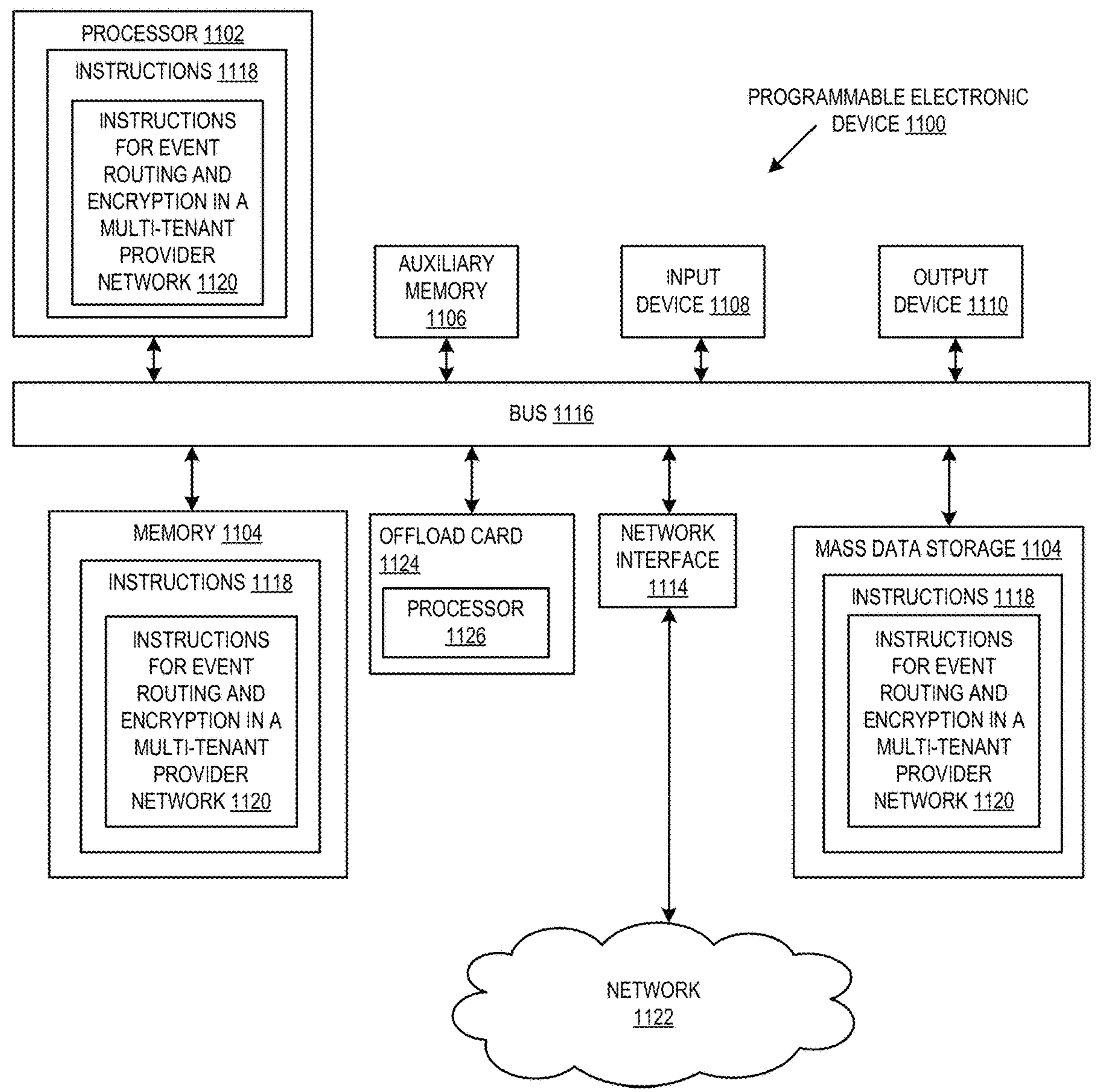
FIG. 11 illustrates an example of a programmable electronic device that processes and manipulates data to perform tasks and calculations disclosed herein for event routing and encryption in a multi-tenant provider network.

FIG. 11 illustrates an example of a programmable electronic device that processes and manipulates data to perform tasks and calculations disclosed herein for event routing and encryption in a multi-tenant provider network. Example programmable electronic device 1100 includes electronic components encompassing hardware or hardware and software including processor 1102, memory 1104, auxiliary memory 1106, input device 1108, output device 1110, mass data storage 1112, network interface 1114, and offload card 1124, all connected to bus 1116.

While only one of each type of component is depicted in FIG. 11 for the purpose of providing a clear example, multiple instances of any or all these electronic components may be present in device 1100. For example, multiple processors may be connected to bus 1116 in a particular implementation of device 1100. Accordingly, unless the context clearly indicates otherwise, reference with respect to FIG. 11 to a component of device 1100 in the singular such as, for example, processor1102, is not intended to exclude the plural where, in a particular instance of device 1100, multiple instances of the electronic component are present. Further, some electronic components may not be present in a particular instance of device 1100. For example, device 1100 in a headless configuration such as, for example, when operating as a server racked in a data center, may not include, or be connected to, input device 1108 or output device 1110. As another example, offload card 1124 may be absent from device 1100 when not operating as a server racked in a data center as part of a cloud-based hosted compute service.

Processor 1102 is an electronic component that processes (e.g., executes, interprets, or otherwise processes) instructions 1118 including instructions 1120 for event routing and encryption in a multi-tenant provider network. Processor 1102 may perform arithmetic and logic operations dictated by instructions 1118 and coordinate the activities of other electronic components of device 1100 in accordance with instructions 1118. Processor 1102 may fetch, decode, and execute instructions 1118 from memory 1104. Processor 1102 may include a cache used to store frequently accessed instructions 1118 to speed up processing. Processor 1102 may have multiple layers of cache (L1, L2, L3) with varying speeds and sizes. Processor 1102 may be composed of multiple cores where each such core is a processor within processor 1102. The cores may allow processor 1102 to process multiple instructions 1118 at once in a parallel processing manner. Processor 1102 may support multi-threading where each core of processor 1102 can handle multiple threads (multiple sequences of instructions) at once to further enhance parallel processing capabilities. Processor 1102 may be made using silicon wafers according to a manufacturing process (e.g., 7 nm, 5 nm, or 3 nm). Processor 1102 can be configured to understand and execute a set of commands referred to as an instruction set architecture (ISA) (e.g., x86, x86_64, or ARM).

Depending on the intended application, processor 1102 can be any of the following types of central processing units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other suitable type of CPU.

While processor 1102 can be a CPU, processor 1102, depending on the intended application, can be any of the following types of processors: a graphics processing unit (GPU) capable of highly parallel computation allowing for processing of multiple calculations simultaneously and useful for rendering images and videos and for accelerating machine learning computation tasks; a digital signal processor (DSP) designed to process analog signals like audio and video signals into digital form and vice versa, commonly used in audio processing, telecommunications, and digital imaging; a tensor processing unit (TPU) or other specialized hardware for machine learning workloads, especially those involving tensors (multi-dimensional arrays); a field-programmable gate array (FPGA) or other reconfigurable integrated circuit that can be customized post-manufacturing for specific applications, such as cryptography, data analytics, and network processing; a neural processing unit (NPU) or other dedicated hardware designed to accelerate neural network and machine learning computations, commonly found in mobile devices and edge computing applications; an image signal processor (ISP) specialized in processing images and videos captured by cameras, adjusting parameters like exposure, white balance, and focus for enhanced image quality; an accelerated processing unit (APU) combing a CPU and a GPU on a single chip to enhance performance and efficiency, especially in consumer electronics like laptops and consoles; a vision processing unit (VPU) dedicated to accelerating machine vision tasks such as image recognition and video processing, typically used in drones, cameras, and autonomous vehicles; a microcontroller unit (MCU) or other integrated processor designed to control electronic devices, containing CPU, memory, and input/output peripherals; an embedded processor for integration into other electronic devices such as washing machines, cars, industrial machines, etc.; a system on a chip (SoC) such as those commonly used in smartphones encompassing a CPU integrated with other components like a graphics processing unit (GPU) and memory on a single chip; or any other suitable type of processor.

Memory 1104 is an electronic component that stores data and instructions 1118 that processor 1102 processes. Memory 1104 provides the space for the operating system, applications, and data in current use to be quickly reached by processor 1102. For example, memory 1104 may be a random-access memory (RAM) that allows data items to be read or written in substantially the same amount of time irrespective of the physical location of the data items inside memory 1104.

In some instances, memory 1104 is a volatile or non-volatile memory. Data stored in a volatile memory is lost when the power is turned off. Data in non-volatile memory remains intact even when the system is turned off. For example, memory 1104 can be Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. Memory 1104 can be Static RAM (SRAM). SRAM is volatile memory that is typically faster but more expensive than DRAM. SRAM uses multiple transistors for each memory cell but does not need to be periodically refreshed. Additionally, or alternatively, SRAM may be used for cache memory in processor 1102.

Device 1100 has auxiliary memory 1106 other than memory 1104. Examples of auxiliary memory 1106 include cache memory, register memory, read-only memory (ROM), secondary storage, virtual memory, memory controller, and graphics memory. Device 1100 may have multiple auxiliary memories including different types of auxiliary memories. Cache memory is found inside or very close to processor 1102 and is typically faster but smaller than memory 1104.

Cache memory may be used to hold frequently accessed instructions 1118 (encompassing any associated data) to speed up processing. Cache memory may be hierarchical ranging from Level 1 cache memory which is the smallest but fastest cache memory and is typically inside processor 1102 to Level 2 and Level 3 cache memory which are progressively larger and slower cache memories that can be inside or outside processor 1102. Register memory is a small but very fast storage location within processor 1102 designed to hold data temporarily for ongoing operations. ROM is a non-volatile memory device that can only be read, not written to. For example, ROM can be a Programmable ROM (PROM), Erasable PROM (EPROM), or electrically erasable PROM (EEPROM). ROM may store basic input/output system (BIOS) instructions which help device 1100 boot up. Secondary storage is a non-volatile memory. For example, a secondary storage can be a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device. Virtual memory is a portion of a hard drive or an SSD that the operating system uses as if it were memory 1104. When memory 1104 gets filled, less frequently accessed data and instructions 1118 can be "swapped" out to the virtual memory. The virtual memory is slower than memory 1104, but it provides the illusion of having a larger memory 1104. A memory controller manages the flow of data and instructions 1118 to and from memory 1104. The memory controller can be located either on the motherboard of device 1100 or within processor 1102. Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Input device 1108 is an electronic component that allows users to feed data and control signals into device 1100. Input device 1108 translates a user's action or the data from the external world into a form that device 1100 can process. Examples of input device 1108 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 1110 is an electronic component that conveys information from device 1100 to the user or to another device. The information can be in the form of text, graphics, audio, video, or other media representation. Examples of an output device 1110 include a monitor or display device, a printer device, a speaker device, a headphone device, a projector device, a plotter device, a braille display device, a haptic device, a LED or LCD panel device, a sound card, and a graphics or video card.

Mass data storage 1112 is an electronic component used to store data and instructions 1118. Mass data storage 1112 may be non-volatile memory. Examples of mass data storage 1112 include a hard disk drive (HDD), a solid-state drive (SDD), an optical drive, a flash memory device, a magnetic tape drive, a floppy disk, an external drive, or a RAID array device. Mass data storage 1112 could additionally or alternatively be connected to device 1100 via network 1122. For example, mass data storage 1112 could encompass a network attached storage (NAS) device, a storage area network (SAN) device, a cloud storage device, or a centralized network filesystem device.

Network interface 1114 (sometimes referred to as a network interface card, NIC, network adapter, or network interface controller) is an electronic component that connects device 1100 to network 1122. Network interface 1114 functions to facilitate communication between device 1100 and network 1122. Examples of a network interface 1114 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 1116 is an electronic component that transfers data between other electronic components of or connected to device 1100. Bus 1116 serves as a shared highway of communication for data and instructions (e.g., instructions 1118), providing a pathway for the exchange of information between components within device 1100 or between device 1100 and another device. Bus 1116 connects the different parts of device 1100 to each other. For example, bus 1116 may encompass one or more of: a system bus, a front-side bus, a data bus, an address bus, a control bus, an expansion bus, a universal serial bus (USB), a I/O bus, a memory bus, an internal bus, an external bus, and a network bus.

Instructions 1118 are computer-processable instructions that can take different forms. Instructions 1118 can be in a low-level form such as binary instructions, assembly language, or machine code according to an instruction set (e.g., x86, ARM, MIPS) that processor 1102 is designed to process. Instructions 1118 can include individual operations that processor 1102 is designed to perform such as arithmetic operations (e.g., add, subtract, multiply, divide, etc.); logical operations (e.g., AND, OR, NOT, XOR, etc.); data transfer operations including moving data from one location to another such as from memory 1104 into a register of processor 1102 or from a register to memory 1104; control instructions such as jumps, branches, calls, and returns; comparison operations; and specialization operations such as handling interrupts, floating-point arithmetic, and vector and matrix operations. Instructions 1118 can be in a higher-level form such as programming language instructions in a high-level programming language such as Python, Java, C++, etc. Instructions 1118 can be in an intermediate level form in between a higher-level form and a low-level form such as bytecode or an abstract syntax tree (AST).

Instructions 1118 for processing by processor 1102 can be in different forms at the same or different times. For example, when stored in mass data storage 1112 or memory 1104, instructions 1118 may be stored in a higher-level form such as Python, Java, or other high-level programing language instructions, in an intermediate-level form such as Python or Java bytecode that is compiled from the programming language instructions, or in a low-level form such as binary code or machine code. When stored in processor 1102, instructions 1118 may be stored in a low-level form such as binary instructions, assembly language, or machine code according to an instruction set architecture (ISA). However, instructions 1118 may be stored in processor 1102 in an intermediate level form or even a high-level form where CPU 1102 can process instructions in such form.

Instructions 1118 may be processed by one or more processors of device 1100 using different processing models including any or all of the following processing models depending on the intended application: sequential execution where instructions are processed one after another in a sequential manner; pipelining where pipelines are used to process multiple instruction phases concurrently; multiprocessing where different processors different instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several instructions during a single clock cycle; parallel data operations where a single instruction is used to perform operations on multiple data elements concurrently; clustered or distributed computing where multiple processors in a network (e.g., in the cloud) collaboratively process the instructions, distributing the workload across the network; graphics processing unit (GPU) acceleration where GPUs with their many processors allow the processing of numerous threads in parallel, suitable for tasks like graphics rendering and machine learning; asynchronous execution where processing of instructions is driven by events or interrupts, allowing the one or more processors to handle tasks asynchronously; concurrent instruction phases where multiple instruction phases (e.g., fetch, decode, execute) of different instructions are handled concurrently; parallel task processing where different processors handle different tasks or different parts of data, allowing for concurrent processing and execution; or any other suitable processing model.

Network 1122 is a collection of interconnected computers, servers, and other programmable electronic devices that allow for the sharing of resources and information. Network 1122 can range in size from just two connected devices to a global network (e.g., the internet) with many interconnected devices. Individual devices on network 1122 are sometimes referred to as "network nodes." Network nodes communicate with each other through mediums or channels sometimes referred to as "network communication links." The network communication links can be wired (e.g., twisted-pair cables, coaxial cables, or fiber-optic cables) or wireless (e.g., Wi-Fi, radio waves, or satellite links). Network 1122 may encompass network devices such as routers, switches, hubs, modems, and access points. Network nodes may follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext Transfer Protocol) and HTTPS (HTTP Secure), and routing protocols such as OSPF (Open Shortest Path First) and BGP (Border Gateway Protocol). Network 1122 may have a particular physical or logical layout or arrangement sometimes referred to as a "network topology." Example network topologies include bus, star, ring, and mesh. Network 1122 can be different of different sizes and scopes. For example, network 1122 can encompass some or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

Device 1100 includes offload card 1124. Offload card 1124 includes its own processor 1126. Although not depicted in FIG. 1, offload card 1124 may also include network interface 1114. Offload card 1124 may be connected to bus 1116 via a Peripheral Component Interconnect-Express (PCI-E) standard or other suitable interconnect standard such as, for example, a QuickPath interconnect (QPI) standard or an UltraPath interconnect (UPI) standard. Device 1100 may include offload card 1124 when device 1100 acts as a host electronic device such as, for example, when operating as part of a hosted compute service. In this case, device 1100 hosts compute instances such as, for example, virtual machine instances or application container instances and offload card 1124 and processor 1126 run a hosted compute manager application that can manage the hosted compute instances that run on device 1100 and processor 1102. For example, the hosted compute manager application may perform hosted compute instance management operations, such as pausing or un-pausing hosted compute instances, launching or terminating hosted compute instances, performing memory transfer/copying operations, or other suitable hosted compute instance management operations. These management operations can, in some instances, be performed by the hosted compute manager application in coordination with a hypervisor (e.g., upon a request from the hypervisor) that runs on device 1100 and processor 1102. However, in some instances the hosted compute manager application is configured to process requests from other entities (e.g., from the hosted compute instances themselves), and does not coordinate with a hypervisor on device 1100.

Terminology

As used herein and in the appended claims, the term "computer-readable media" refers to one or more mediums or devices that can store or transmit information in a format that a computer system can access. Computer-readable media encompasses both storage media and transmission media. Storage media includes volatile and non-volatile memory devices such as RAM devices, ROM devices, secondary storage devices, register memory devices, memory controller devices, graphics memory devices, and the like.

As used herein and in the appended claims, the term "non-transitory computer-readable media" as used herein encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

As used herein, unless otherwise clear in context, the term "or" is open-ended and encompasses all possible combinations, except where infeasible. For example, if it is stated that a component may include A or B, then, unless infeasible or otherwise clear in context, the component may include at least A, or at least B, or at least A and B. As a second example, if it is stated that a component may include A, B, or C then, unless infeasible or otherwise clear in context, the component may include at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed at an event bus service in a multi-tenant provider network, the method comprising:
- receiving a first event structure at an event bus, wherein the first event structure represents an event, and wherein the event bus is provisioned to a first provider network customer account;
- evaluating a set of one or more routing rules defined for the event bus against the first event structure;
- determining that the first event structure matches an event pattern of a particular routing rule of the set of one or more routing rules, wherein the particular routing rule specifies a particular target resource in the multi-tenant provider network, wherein the particular target resource is provisioned to a second provider network customer account, and wherein the particular routing rule defined for the event bus provisioned to the first provider network customer account was configured by the second provider network customer account;
- selecting a particular cryptographic key to use to encrypt the event data based on the particular routing rule or the particular target resource;
- encrypting event data of the first event structure using a particular cryptographic key belonging to the second provider network account to yield encrypted event data;
- durably storing the encrypted event data before delivery of the encrypted event data to the particular target resource; and
- delivering a second event structure representing the event to the particular target resource, wherein the second event structure comprises the encrypted event data.

2. The method of claim 1, further comprising selecting the particular cryptographic key to use to encrypt the event data based on determining a user-specified association between the particular cryptographic key and the particular routing rule.

3. The method of claim 1, further comprising selecting the particular cryptographic key to use to encrypt the event data based on determining a user-specified association between the particular cryptographic key and the particular target resource.

4. A method performed at an event bus service in a multi-tenant provider network, the method comprising:
- receiving a first event structure at an event bus, wherein the first event structure represents an event, and wherein the event bus is provisioned to a first provider network customer account;
- evaluating a set of one or more routing rules defined for the event bus against the first event structure;
- determining that the first event structure matches an event pattern of a particular routing rule of the set of one or more routing rules, wherein the particular routing rule specifies a particular target resource in the multi-tenant provider network, wherein the particular target resource is provisioned to a second provider network customer account, and wherein the particular routing rule defined for the event bus provisioned to the first provider network customer account was configured by the second provider network customer account;

encrypting event data of the first event structure using a particular cryptographic key belonging to the second provider network account to yield encrypted event data; and delivering a second event structure representing the event to the particular target resource, wherein the second event structure comprises the encrypted event data.

5. The method of claim 4, further comprising selecting the particular cryptographic key to use to encrypt the event data based on determining a user-specified association between the particular cryptographic key and the particular routing rule.

6. The method of claim 4, further comprising selecting the particular cryptographic key to use to encrypt the event data based on determining a user-specified association between the particular cryptographic key and the particular target resource.

7. The method of claim 4, wherein the second event structure identifies in plaintext the particular cryptographic key used to encrypt the event data.

8. The method of claim 4, wherein the second event structure identifies in plaintext the event bus.

9. The method of claim 4, wherein a multi-tenant service in the multi-tenant provider network comprises the particular target resource provisioned to the second provider network customer account and also comprises other resources provisioned to other provider network customer accounts.

10. The method of claim 4, wherein the event bus is a first event bus; wherein the particular target resource comprises a second event bus provisioned to the second provider network customer account; and wherein the method further comprises:

receiving the second event structure at the second event bus, the second event structure comprising an unencrypted portion and the encrypted event data;

using the particular cryptographic key or a cryptographic key associated with the particular cryptographic key to decrypt the encrypted event data to yield a decrypted event data;

evaluating a set of one or more routing rules defined for the second event bus against a third event structure, wherein the third event structure comprises the unencrypted portion and the decrypted event data;

encrypting the decrypted event data using the particular cryptographic key to yield a re-encrypted event data; and durably storing the re-encrypted event data.

11. The method of claim 4, further comprising:

receiving a request to publish the first event structure to the event bus, the request comprising an identifier of the particular cryptographic key; and selecting the particular cryptographic key to use to encrypt the event data based on the particular cryptographic key being identified in the request to publish.

12. The method of claim 4, further comprising:

receiving a request to publish the first event structure to the event bus, wherein the request to publish comprises the particular cryptographic key; and selecting the particular cryptographic key to use to encrypt the event data based on the particular cryptographic key being in the request to publish.

13. The method of claim 1, further comprising:

receiving a request to publish the first event structure to the event bus, wherein the first event structure comprises a plurality of cryptographic keys, wherein the plurality of cryptographic keys comprises the particular cryptographic key, and wherein the request to publish comprises a path expression selecting the particular cryptographic key in the first event structure; and selecting the particular cryptographic key to use to encrypt the event data based on the particular cryptographic key being selected by the path expression of the request to publish.

14. A system comprising:

one or more programmable electronic devices to implement an event-bus service in a multi-tenant provider network, the event bus service comprising instructions which processed by one or more processors cause the event bus service to:

receive a first event structure at an event bus, wherein the first event structure represents an event, wherein the event bus is provisioned to a first provider network customer account;

evaluate a set of one or more routing rules defined for the event bus against the first event structure;

determine that the first event structure matches an event pattern of a particular routing rule of the set of one or more routing rules, wherein the particular routing rule specifies a particular target resource in the multi-tenant provider network, wherein the particular target resource is provisioned to a second provider network customer account, and wherein the particular routing rule defined for the event bus provisioned to the first provider network customer account was configured by the second provider network customer account;

encrypt event data of the first event structure using a particular cryptographic key accessible to the second provider network account to yield encrypted event data; and deliver a second event structure representing the event to the particular target resource, wherein the second event structure comprises the encrypted event data.

15. The system of claim 14, wherein the event bus service further comprises instructions which processed by one or more processors cause the event bus service to select the particular cryptographic key to use to encrypt the event data based on determining a user-specified association between the particular cryptographic key and the particular routing rule.

16. The system of claim 14, wherein the event bus service further comprises instructions which processed by one or more processors cause the event bus service to select the particular cryptographic key to use to encrypt the event data based on determining a user-specified association between the particular cryptographic key and the particular target resource.

17. The system of claim 14, wherein the second event structure identifies in plaintext the particular cryptographic key used to encrypt the event data.

18. The system of claim 14, wherein the second event structure identifies in plaintext the event bus.

19. The system of claim 14, further comprising one or more programmable electronic devices to implement a multi-tenant service in the multi-tenant provider network that comprises the particular target resource provisioned to the second provider network customer account and comprises other resources provisioned to other provider network customer accounts.

20. The system of claim 14, wherein the event bus is a first event bus, wherein the particular target resource comprises a second event bus provisioned to the second provider network customer account, and wherein the event bus service further comprises instructions which processed by one or more processors cause the event bus service to:

receive the second event structure at the second event bus, wherein the second event structure comprises an unencrypted portion and the encrypted event data;

use the particular cryptographic key or a cryptographic key associated with the particular cryptographic key to decrypt the encrypted event data to yield a decrypted event data;

evaluate a set of one or more routing rules defined for the second event bus against a third event structure, wherein the third event structure comprises the unencrypted portion and the decrypted event data;

encrypt the decrypted event data using the particular cryptographic key to yield a re-encrypted event data; and durably store the re-encrypted event data.

* * * * *